US006948446B2

(12) United States Patent  (10) Patent No.: US 6,948,446 B2
Greves                    (45) Date of Patent:    Sep. 27, 2005

(54) REFLECTIVE ARROWHEAD TRAFFIC SIGN APPARATUS

(75) Inventor: Kenneth J. Greves, Lawrenceburg, IN (US)

(73) Assignee: RTS, LLC, Lawrenceburg, IN (US)

( * ) Notice: Subject to any disclaimer, the term of this patent is extended or adjusted under 35 U.S.C. 154(b) by 0 days.

(21) Appl. No.: 10/464,172

(22) Filed: Jun. 18, 2003

(65) Prior Publication Data

US 2004/0255838 A1 Dec. 23, 2004

(51) Int. Cl.$^7$ ............................................. E01F 9/019
(52) U.S. Cl. ................... 116/63 P; 116/63 T; 116/28 R
(58) Field of Search .............................. 116/63 R, 63 P, 116/63 C, 63 T, 28 R; 40/591, 605, 613, 903, 612; 404/6, 9, 12

(56) References Cited

U.S. PATENT DOCUMENTS

| 1,327,387 | A | * | 1/1920 | Hockaday | 40/612 |
|---|---|---|---|---|---|
| 1,343,247 | A | * | 6/1920 | Buss | 40/612 |
| 1,345,974 | A | | 7/1920 | Watts | |
| 1,382,627 | A | | 6/1921 | Cuthbertson | |
| 1,391,830 | A | | 9/1921 | Hewes | |
| 1,497,958 | A | * | 6/1924 | Swinford | 40/612 |
| 1,513,414 | A | | 10/1924 | Moyer | |
| 1,520,472 | A | * | 12/1924 | Hurst | 40/605 |
| 1,570,158 | A | | 1/1926 | Knight | |
| 1,896,314 | A | | 2/1933 | Jones | |
| 1,987,863 | A | | 1/1935 | Murphy | |
| 2,024,077 | A | * | 12/1935 | Thomas | 40/612 |
| 2,084,252 | A | | 6/1937 | Hallenberg | |
| 2,144,813 | A | | 1/1939 | Roan et al. | |
| 2,313,222 | A | | 3/1943 | Clifton | |
| 2,601,587 | A | | 6/1952 | Burmeister | |
| 2,625,900 | A | | 1/1953 | Glass | |
| 2,669,705 | A | | 2/1954 | Collins | |
| 2,737,740 | A | * | 3/1956 | Genoe | 116/63 R |
| 2,881,543 | A | | 4/1959 | DeRouen | |
| 2,903,688 | A | | 9/1959 | Sorensen | |
| 3,132,628 | A | * | 5/1964 | Gehlsen | 116/63 P |
| 3,162,836 | A | | 12/1964 | Vreugdenhil | |
| 3,223,387 | A | | 12/1965 | Magliocco | |
| 3,262,415 | A | | 7/1966 | Biscardi | |
| 3,334,554 | A | | 8/1967 | Adams | |
| 3,393,464 | A | * | 7/1968 | De Vane | 40/591 |
| 3,394,498 | A | | 7/1968 | Reinitz et al. | |
| 3,555,715 | A | | 1/1971 | Shell | |
| 3,622,980 | A | | 11/1971 | Elledge, Jr. | |
| 3,691,366 | A | | 9/1972 | Spreuer | |
| 3,703,152 | A | | 11/1972 | Morton | |
| 3,788,268 | A | | 1/1974 | Hiatt et al. | |
| D234,754 | S | | 4/1975 | Hall, Jr. | |
| 3,961,596 | A | | 6/1976 | Schiavone | |
| 4,152,854 | A | | 5/1979 | Berry, Jr. et al. | |

(Continued)

FOREIGN PATENT DOCUMENTS

GB        2210491 A  *  6/1989  ........... G09F/21/04

Primary Examiner—Christopher W. Fulton
Assistant Examiner—Travis Reis
(74) Attorney, Agent, or Firm—Frederick H. Gribbell, LLC

(57) ABSTRACT

A highly reflective arrowhead traffic sign is provided which exhibits an arrow shape to "aim" traffic to one side or the other along a roadway. A horizontal longitudinal member has at least one pair of arrow-shaped "wings" that extend beyond the outer boundary of the horizontal member. The wing sets can be attached to the horizontal member by use of locating holes and mating pins, or they can be pivotally mounted on the horizontal member. The arrow wings can be shaped into a configuration that points to the left or to the right, or they can be placed on both ends of the horizontal member and simultaneously point to both the left and right, thereby indicating to traffic that a lane is closed, and that traffic must go either left or right to avoid the closed lane.

21 Claims, 27 Drawing Sheets

U.S. PATENT DOCUMENTS

| | | | |
|---|---|---|---|
| 4,176,484 A | * 12/1979 | Terris | 40/612 |
| 4,176,485 A | * 12/1979 | Terris | 40/612 |
| 4,197,808 A | 4/1980 | Kinninger | |
| D264,565 S | 5/1982 | Medeiros | |
| 4,489,306 A | 12/1984 | Scolari | |
| 4,543,905 A | 10/1985 | McKenney | |
| 4,613,847 A | 9/1986 | Scolari et al. | |
| 4,687,369 A | 8/1987 | McDonald | |
| 4,729,338 A | * 3/1988 | Relzmann | 116/28 R |
| 4,759,606 A | 7/1988 | McDowell | |
| 4,825,192 A | 4/1989 | Wells | |
| 5,097,612 A | 3/1992 | Williams | |
| 5,103,205 A | 4/1992 | Halligan | |
| 5,155,667 A | 10/1992 | Ho | |
| 5,224,439 A | 7/1993 | O'Connell et al. | |
| 5,249,381 A | 10/1993 | Panossian | |
| 5,339,765 A | * 8/1994 | Ward | 116/63 P |
| 5,433,026 A | 7/1995 | McDermott et al. | |
| 5,450,058 A | 9/1995 | Collier | |
| 5,775,016 A | 7/1998 | Chien | |
| 6,138,394 A | 10/2000 | Sulenski | |
| 6,142,701 A | 11/2000 | Falcon | |
| 6,213,047 B1 | 4/2001 | Means et al. | |
| 2003/0166360 A1 | * 9/2003 | Thornton et al. | 439/630 |

* cited by examiner

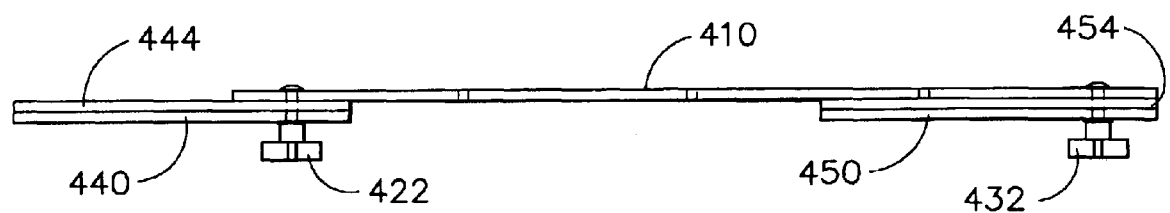
FIG. 38
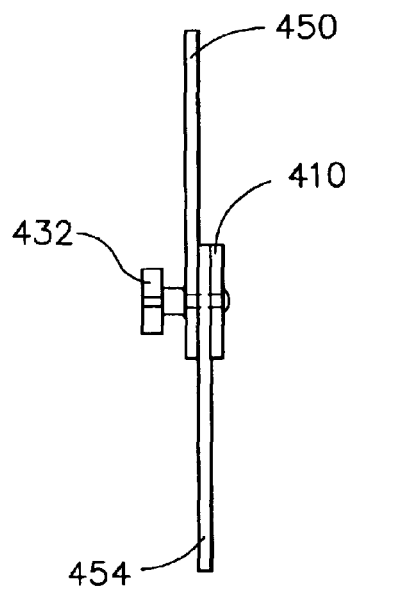 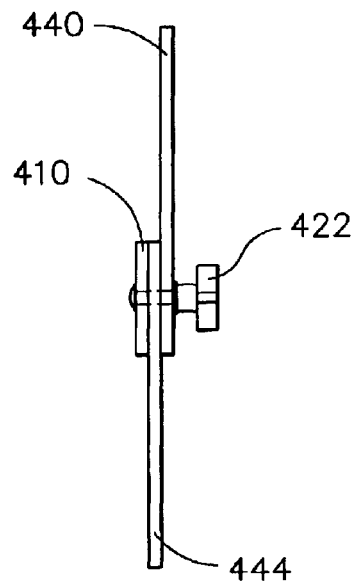
FIG. 39   FIG. 40

REFLECTIVE ARROWHEAD TRAFFIC SIGN APPARATUS

TECHNICAL FIELD

The present invention relates generally to traffic direction signs and is particularly directed to highly-reflective signs of the type which exhibit an arrow shape to "aim" traffic to one side or the other along a roadway. The invention is specifically disclosed as a horizontal longitudinal member that has at least one pair of arrow-shaped "wings" that extend beyond the outer boundary or perimeter of the horizontal member. The horizontal member can be of a single-piece construction, or it can be segmented into several pieces that are easily joined to form a single, longer member, or it can be of a telescoping design so as to be readily formed into a longer shape. The arrow wings can be attached to the horizontal member by use of locating holes and mating pins, or they can be pivotally mounted on the horizontal member. The arrow wings can be shaped into a configuration that points to the left, or to the right; also, the arrow wings can be placed on both ends of the horizontal member and simultaneously point to both the left and right, thereby indicating to traffic that a lane is closed, and that traffic must go either left or right to avoid the closed lane.

BACKGROUND OF THE INVENTION

Traffic signs are quite old in the art, including signs that point to one side or the other, using an arrowhead-style pointer. Many of these traffic signs are self-illuminating, while others are reflective. U.S. Pat. No. 5,224,439 (by O'Connell) discloses a light-reflective warning arrow that can be mounted on the raised trunk lid of an automobile, or can be magnetically secured to a metal body of a vehicle. The warning arrow is made of several brightly-colored pieces of fabric material, or self-adhering fabric strips that couple to the frame of the mounting portion. O'Connell states that the preferred material is a polypropylene film with an acrylic coating, which is a well-known material, and typically comes as an orange or white open-mesh fabric. This fabric can make up the background of a large rectangular sign. A second fabric material that can be selected from a solid polyester (that could be colored yellow) makes up a set of rectangular strips that are formed into an arrowhead shape.

O'Connell also uses a large number of small filaments that reflect light and run along the edges of some of the arrowhead-rectangular pieces. These filaments are fabricated from a sheet of SCOTCHLITE™ reflective material manufactured by 3M. O'Connell weaves these filaments into the edges of his rectangular arrowhead portions, and reduces the size of these filaments to about 0.015 inches in width. They are spaced longitudinally about $\frac{1}{16}$ inches apart. The entire sign can be made to point either left or right, merely by reversing the orientation of the warning arrow mount. O'Connell discusses the idea of using a self-adhering fabric such as VELCRO™ that would hold the sign in place. The opposite half of the VELCRO self-adhering fabric could be attached to the inner roof of the trunk of an automobile with some type of self-adhering adhesive strips. The adhesive strips can have a paper backing that is coated with a release compound, and when needed, the paper backing can be pulled off to expose the adhesive side of the VELCRO self-adhering fabric strip. As an alternative, permanent magnets could be used to hold the sign to a metal structure, such as the inner roof of a trunk lid.

Another patented design is disclosed in U.S. Pat. No. 4,687,369 (by McDonald), which discloses a traffic marker that can be placed on a road surface to indicate a detour lane for construction sites. The marker has the appearance of an arrowhead, and can consist of a single flat piece, or it can come in segments that are temporarily fastened together. One segmented embodiment arranges the arrowhead itself as a triangle, and two rectangular pieces are attached by an interlocking shape that fits like a jigsaw puzzle piece. One interlocking shape has the appearance of a trapezoid. In one segmented sign design, the interlocking pieces have a jigsaw puzzle-like appearance, in which the protruding interlocking pieces are referred to as a tenon, whereas the interlocking female portions are called a mortise.

U.S. Pat. No. 6,213,047 (by Means) discloses an extendable emergency vehicle safety barrier which has either reflectors or some type of illuminating lamps. The main embodiment shows a telescoping member that pulls out as three sections, each having a small rectangular-shaped reflector. Its main purpose is to be attached to the side of a vehicle (such as a truck), where it can be pivoted 90 degrees and then the telescoping members can be pulled out to provide some clearance such that other vehicles cannot pass too closely to the sides of the truck. The reflecting members are not arrow shaped.

U.S. Pat. No. 4,613,847 (by Scolari) discloses a telescoping emergency signal that extends vertically, and can be equipped with a strobe light. The first embodiment shows four telescoping sections that extend vertically up from a base section. The word HELP is on these four sections (one letter per section), and the letters in the word HELP are cutouts made of a translucent colored sheet material. There is also a reflector panel in the inner spaces, and a strobe light that reflects the colored surface of the reflector panels through the letters in the word HELP. A second embodiment discloses a vertical telescoping member that has four chevron-shaped arrows on the one telescoping member. Using strobe lights, the chevron arrow shapes can flash separately and sequentially, thereby creating a "moving signal." This telescoping member slides back into a vertical base member that is held in place by a tripod-shaped stand. The overall device looks like a jack stand. However, the chevrons of the telescoping member do not have arrow "wings" or "arms" that extend beyond the outer dimensions of the telescoping member itself.

U.S. Pat. No. 3,162,836 (by Vreugdenhil) discloses a turn indicator for ships, which comprises a pivotable arrow shape with electric lights. An arrowhead-shaped design has a horizontal shaft and two pivotable arms that pivot at the tip of the arrow shaft. This device is not necessarily made to be reflective, but is made to be visible at relatively long distances (at least one mile) by the use of light bulbs that are spaced-apart by a minimum distance. Vreugdenhil's turn indicator apparently is designed to have two separate arrowhead tips, so that the pivotable arms on either end can be spread to indicate a turn either to the left or to the right. Of course, Vreugdenhil does not rely on reflective members, but provides light bulbs that will illuminate the shape of the turn indicator for quite a long distance, even in low visibility conditions.

U.S. Pat. No. 3,223,387 (by Magliocco) discloses a portable street barrier that includes several pivotable lengths or sections that can be extended into a single long arm, much like a variable-length yardstick sold by Sears. The pivotable lengths can also be folded back into a very compact space. In two configurations the street barrier can have its arms folded into an asterisk shape to act as a "stop" indication, or can be pointing to the right to indicate the desired direction for traffic. Magliocco is pivotable in multiple segments throughout its entire length, and could be formed into other shapes. However, Magliocco could not be formed into two separate sets of arrow wings on opposite ends of the horizontal shaft, because its left end is attached to a vertical post that itself is mounted to the ground.

It would be an improvement to provide a highly-reflective, or retroreflective, traffic sign that can be used to point to the left or right, or to both directions simultaneously, which is made up of easily-assembled components that can be stored in the trunk of a standard automobile, or in a truck. It also would be an improvement to provide a highly-reflective, or retroreflective, traffic sign that exhibits arrowhead-shaped wing members that are pivotable about a main member, and which extend beyond the boundaries of the main member when in use, but which rotate to a neutral position along the main member when in storage.

SUMMARY OF THE INVENTION

Accordingly, it is an advantage of the present invention to provide a highly reflective arrowhead traffic sign that can be easily assembled and mounted on the side or body of a vehicle, or that can be "hung" from traffic cones in a raised or elevated position.

It is another advantage of the present invention to provide a highly reflective arrowhead sign structure that can be assembled in more than one length while still being structurally rigid, and thus able to "stand" upright by use of certain mounting points.

It is a further advantage of the present invention to provide a highly reflective arrowhead traffic sign that telescopes for ease of assembly and use, but is still structurally rigid and able to stand upright by use of certain mounting points.

It is yet a further advantage of the present invention to provide a highly reflective arrowhead traffic sign in which the main members are constructed by an extrusion process to keep the cost low, while providing a telescoping set of horizontal members and at least one wing set of arrowhead members that pivot along one of the horizontal members.

It is yet another advantage of the present invention to provide a highly reflective arrowhead sign structure that exhibits two pivotable wing sets that are mounted to the two horizontal ends of a main member, in which the individual members of the wing sets can be adjusted to any angle desired by a user, so that both wing sets can be pointed in the same direction, or in opposite directions, if desired.

It is still another advantage of the present invention to provide a highly reflective arrowhead sign structure that has pivotable wing members that extend beyond the outer borders of a horizontal main member, in which each of the main structural members can be extruded to keep the cost low, and in which each of the main members exhibits a planar surface for attachment of a highly reflective or retroreflective material.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, a reflective sign apparatus is provided, which comprises: a longitudinal member having first and second longitudinal edges, a first end and a second end, the longitudinal member having a surface that exhibits a highly reflective characteristic at visible light wavelengths; a first wing member that attachably and detachably snaps onto the longitudinal member along the first longitudinal edge, the first wing member having a surface that exhibits a highly reflective characteristic at visible light wavelengths; and a second wing member that attachably and detachably snaps onto the longitudinal member along the second longitudinal edge, the second wing member having a surface that exhibits a highly reflective characteristic at visible light wavelengths; wherein, when the first and second wing members are attached to the longitudinal member proximal to one of the first and second ends, the reflective sign forms an arrowhead-style pointing shape, such that the longitudinal member forms a shaft-shape and the first and second wing members form an arrowhead tip-shape.

In accordance with another aspect of the present invention, a reflective sign apparatus is provided, which comprises: a first longitudinal member having first and second longitudinal edges, a first end and a second end, the first longitudinal member having a first surface that exhibits a highly reflective characteristic at visible light wavelengths, wherein the first longitudinal member exhibits a first width between the first and second longitudinal edges; at least one second longitudinal member having third and fourth longitudinal edges, a third end and a fourth end, the at least one second longitudinal member having a second surface that exhibits a highly reflective characteristic at visible light wavelengths, wherein the at least one second longitudinal member exhibits a second width between the third and fourth longitudinal edges that is less than the first width between the first and second longitudinal edges of the first longitudinal member, and wherein the at least one second longitudinal member, in a telescoping manner, slides along and is retained within a space between the first and second longitudinal edges of the first longitudinal member; and a first wing member and a second wing member that are attached to the first longitudinal member proximal to the first end, the first and second wing members being positionable so as to extend at an angle that is not substantially parallel to a longitudinal axis of the first longitudinal member and, when so positioned, the first and second wing members extending beyond both the first and second longitudinal edges of the first longitudinal member, the first and second wing members each having a surface that exhibits a highly reflective characteristic at visible light wavelengths; wherein, the reflective sign forms an arrowhead-style pointing shape, such that the first longitudinal member forms a shaft-shape and the first and second wing members form an arrowhead tip-shape.

In accordance with yet another aspect of the present invention, a reflective sign apparatus is provided, which comprises: a longitudinal member having first and second longitudinal edges, a first end and a second end, the longitudinal member having a surface that exhibits a highly reflective characteristic at visible light wavelengths; a first wing member and a second wing member that are pivotally attached to the longitudinal member proximal to the first end, the first and second wing members being pivotable about a first pivot axis that intersects the longitudinal member, the first and second wing members each having a surface that exhibits a highly reflective characteristic at visible light wavelengths, the first and second wing members forming a first wing set; and a third wing member and a fourth wing member that are pivotally attached to the longitudinal member, and which are pivotable about a second pivot axis that intersects the longitudinal member at a location that is spaced-apart from the first pivot axis, the third and fourth wing members each having a surface that exhibits a highly reflective characteristic at visible light wavelengths, the third and fourth wing members forming a second wing set; wherein, when the pivotable positions of the first, second, third, and fourth wing members are not substantially parallel to a longitudinal axis of the longitudinal member, then the first, second, third, and fourth wing members extend beyond both the first and second longitudinal edges of the longitudinal member.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

FIG. 38 is a top view of the reflective arrowhead sign of FIG. 19.

FIG. 39 is a right end or side view of the reflective arrowhead sign of FIG. 20.

FIG. 40 is a left end or side view of the reflective arrowhead sign of FIG. 20.

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
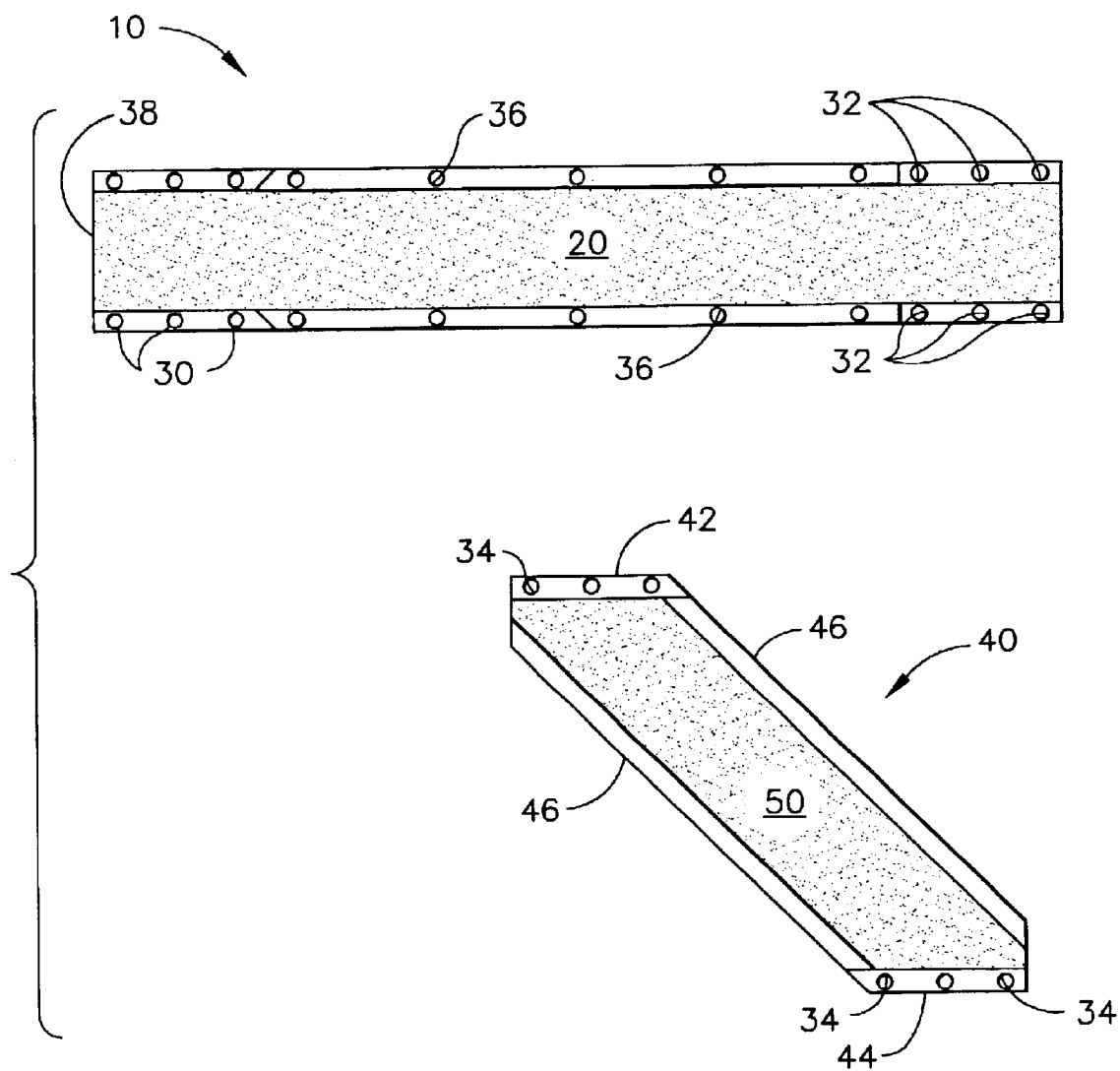
FIG. 1 is an elevational view of a "main" member and a "side" member that make up a portion of a highly reflective arrowhead sign, as constructed according to the principles of the present invention.

Referring now to FIG. 1, a pair of highly reflective elongated members generally designated by the reference numerals 10 and 40 is depicted, and in this embodiment the members comprise plastic injection molded pieces that have highly reflective tape or sheeting applied thereto. The member 10 is substantially rectangular in overall shape, and is bounded along its top and bottom edges (as seen in this view) by a set of openings 32 which will act as locating holes along these longitudinal edges. A similar set of protrusions at 30 act as locating pins, and are also positioned along the longitudinal edges of the member 10. As will be seen in later views, the locating pins 30 can be used to protrude through the holes 32 in other similar members 10, to form a longer rectangular structure.

The rectangular member 10 can be made of any material if desired, but preferably is made of an injectable plastic material, and also preferably has a substantially planar area about its mid-portion along the longitudinal axis. This planar area is typically used to apply an adhesive tape or sheeting material, which is designated at the reference numeral 20 on FIG. 1. Preferred examples of a self-adhesive highly reflective tape or sheeting material are those manufactured by 3M under the trademark name SCOTCHLITE™ DIAMOND GRADE™ fluorescent sheeting, either part number 3983 or 3963. One very bright color that can be used to present a highly reflective surface is the yellow/green color that is available from 3M under either one of these part numbers.

It will be understood that virtually any type of highly reflective surface could be used for the purposes of the present invention, and moreover, a combination of different colors of materials could be used for different portions of the overall structure that will be described below. In general, it will be preferred that the highly reflective surface exhibit a fairly wide angle of retroreflectance, and the 3M reflective sheeting described above will provide this capability. A material that exhibits a high coefficient of retroreflection is typically best, although in some applications a material that has a high degree of diffuse reflection capability may be useable. For traffic signs, it is typical that a specific minimum coefficient of retroreflection is desired, so that an oncoming vehicle can send a beam of light toward the highly reflective material, and then have an ample amount of light reflected back toward the eyes of the human observer driving the vehicle (i.e., at an angle of reflectance other than from typical diffuse reflectance). This is the essence of the retroreflection coefficient. There are industry standards regarding retroreflection of traffic signs, typically available from ASTM.

The other elongated member 40 depicted on FIG. 1 has an overall shape of substantially a quadrilateral, and on two of its edges exhibits a set of openings 34 that act as locating holes that can be placed over the locating pins 30 of the other member 10. The locating holes 34 that are found along the edge 42 can be placed over the locating pins 30 of the member 10 to complete a structure that makes up a portion of an arrowhead shape, which is better viewed in FIG. 2. The opposite edge at 44 also has the locating holes 34. The other two parallel edges are designated at the reference numerals 46.

The member 40 is shaped to exhibit a substantially planar area where a piece of highly reflective tape or sheeting can be mounted or affixed, as seen at the reference numeral 50. This tape (or sheeting) is again highly reflective and preferably comprises the retroreflective 3M tape (or sheeting) that was described above. Also as described above, the highly reflective material 50 can be of a different color than the highly reflective material 20, if desired, or it can be the same color. The 3M tape that is available under the part numbers listed above is readily available in a yellow/green fluorescent color.

Figure 2:
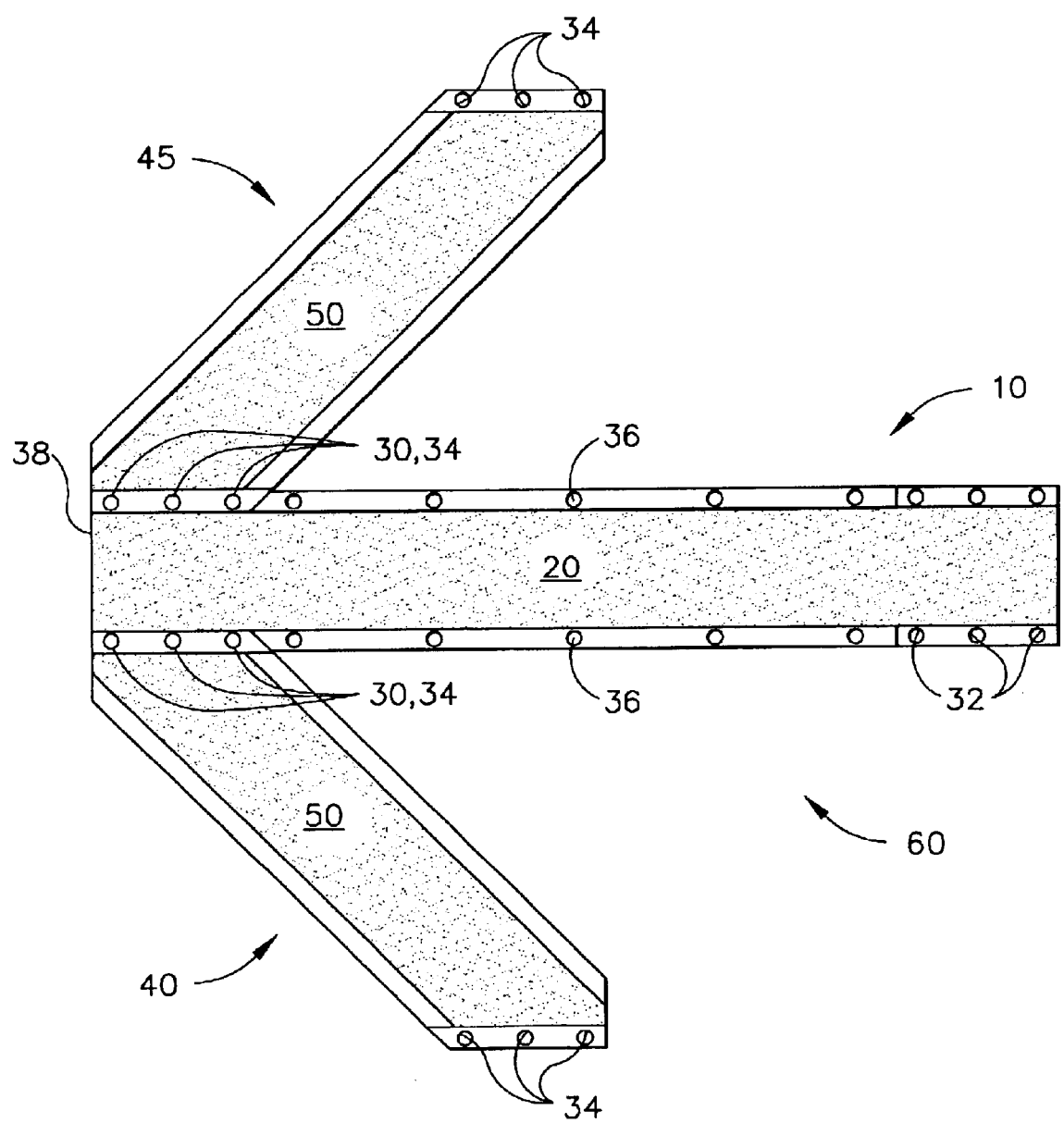
FIG. 2 is a elevational view of an entire arrowhead sign structure, which contains a "main" member and two side or "wing" members of the highly reflective arrowhead sign of FIG. 1.

The member 10 has further openings at 36 along its longitudinal edges, used as mounting holes. There is also a set of transverse edges, and one of those edges at 38 is proximal to the locating pins 30. This edge 38 represents the "tip" of the arrowhead shape when all of the members are assembled, as illustrated in FIG. 2. It is preferred that the spaced-apart openings 36 are positioned along both the top and bottom edges of the "main" member 10, or at least along the upper edge.

FIG. 2 illustrates a completed assembly, generally designated by the reference numeral 60, that has the overall appearance of an arrowhead, which includes the substantially rectangular member 10, an arrowhead side (or "wing") member 40, and also a second arrowhead "wing" member 45 that is substantially similar to the first arrowhead wing member 40. As can be seen on FIG. 2, both arrowhead wing members 40 and 45 are attached at an angle, to form the arrowhead overall shape.

The two wing members 40 and 45 can actually comprise identical structures if they are made in a symmetrical manner such that they can be flipped over. In other words, if the wing member 40 has the highly reflective tape placed on both of its planar surfaces (i.e., on both the "front" and "rear" surfaces), then wing member 40 can be flipped to its opposite side and immediately become the other wing member 45, such that three of its locating holes 34 can be placed over the locating pins 30 and thereby become attached at an angular relationship as seen in FIG. 2.

As noted above, the central or "main" member 10 of the arrowhead structure exhibits openings or holes at 36 in locations along its longitudinal edges, which are other than at its distal end from the front edge 38 (i.e., other than the openings or locating holes 32). These openings 36 can be used to aid in hanging the overall arrowhead structure from some other type of support, so that it is elevated to a position where it can be more easily seen by an approaching vehicle.

Figure 3:
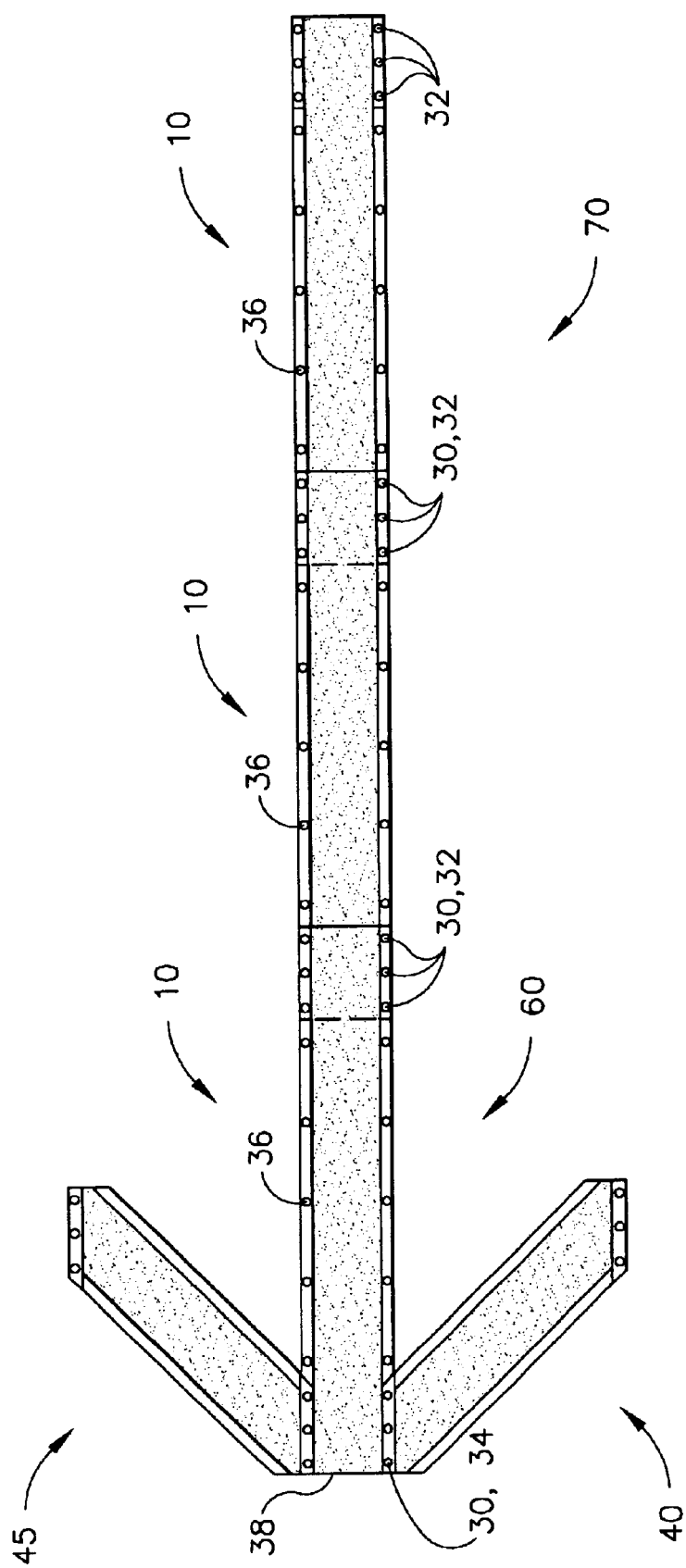
FIG. 3 is a elevational view of an elongated highly reflective arrowhead sign structure, which includes the arrowhead sign structure of FIG. 2 along with two additional "main" members attached thereto.

FIG. 3 depicts an elongated arrowhead sign structure, which includes the arrowhead shape 60 that was illustrated in FIG. 2, and further includes two additional elongated "main" members 10 that are connected to one another by combinations of the locating holes and pins 30 and 32. If the main member 10 is approximately two feet in length, then the overall length of the structure 70 illustrated in FIG. 3 would be about six feet in length. This would cover most of the back surface of a large tractor-trailer, and it would also cover most of the rear width of an automobile. In the case of a truck, the openings 36 along the longitudinal edges of the members 10 can have a wire (or some type of hook) protrude therethrough that can be hung from a door handle or other attachment member along the rear doors of the tractor-trailer vehicle. Alternatively, the elongated arrowhead structure 70 could be mounted by use of traffic cones, for example, as illustrated in FIG. 4.

The structure 60 depicted in FIG. 2 has a substantially arrowhead-style pointing shape, in which the main longitudinal member 10 represents the arrow "shaft" while the side-attached and angled wing members 40 and 45 represent the forward arrow "tip." The structure 70 depicted in FIG. 3 also exhibits a substantially arrowhead-style pointing shape, however, the length of the arrow "shaft" is extended by the addition of the two other longitudinal members 10 that snap together, thereby emphasizing the horizontal portion of the arrowhead overall shape. Either construction will work well using the principles of the present invention. Of course, a single-piece construction for the horizontal "main" member could be provided at virtually any desired length; however, the illustrated three-piece construction will likely be somewhat easier to store (in the trunk of an automobile, for example).

Figure 4:
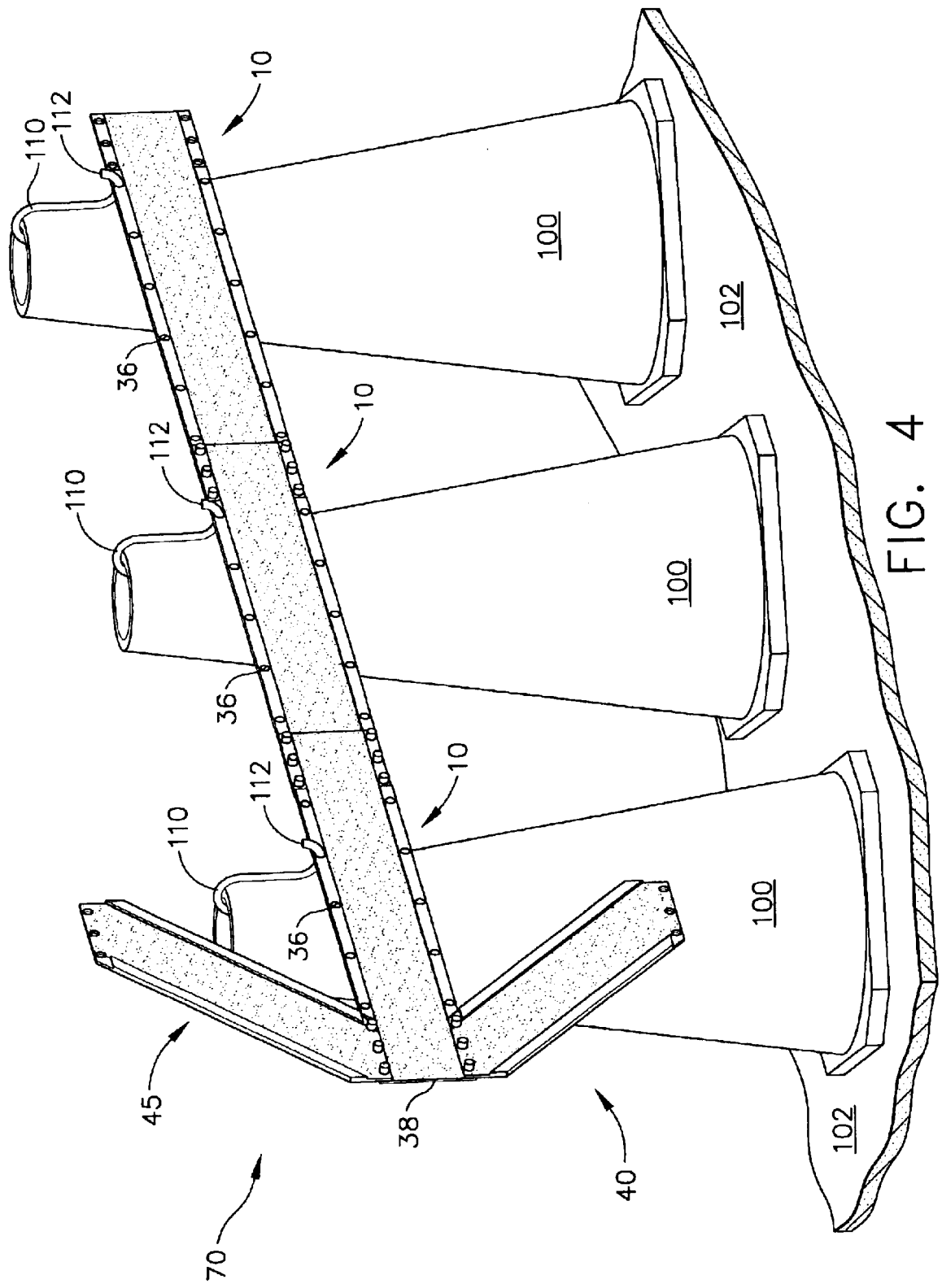
FIG. 4 is a perspective view of the elongated highly reflective arrowhead sign of FIG. 3 as it is mounted along the side of three traffic cones.

In FIG. 4, three traffic cones 100 are set on a road surface or other solid surface at 102, and are spaced apart from one another by a relatively small distance. At the top opening of each of the cones an S-shaped hook 110 protrudes out the top and down along the side surface of the cone 100. The bottom portion of this S-hook protrudes through one of the holes or openings 36 in one of the "main" members 10 of the elongated reflective arrow sign 70. The elongated protruding portion of each of the hooks 110 is identified at the reference numerals 112. In this manner, the entire elongated reflective arrow sign 70 can be placed along a road such that an oncoming vehicle would easily see the sign. This could be used at the rear of a stalled vehicle along the side of the road, or even if it was stalled in the middle of a traffic lane. Since the reflective material that is placed on each of the members of the elongated arrow sign 70 is very highly reflective, and also preferably will exhibit retroreflective characteristics, the arrow sign 70 will be easily seen by such oncoming vehicles even at night, when their headlights strike the highly reflective sheeting of the elongated arrow sign 70.

It will be understood that the arrowhead sign 70 could be easily mounted such that it points either to the left or right. Since the individual members are attached to one another in a rather rigid manner, the sign could also point at other angles, if desired (even straight up).

Figure 5:
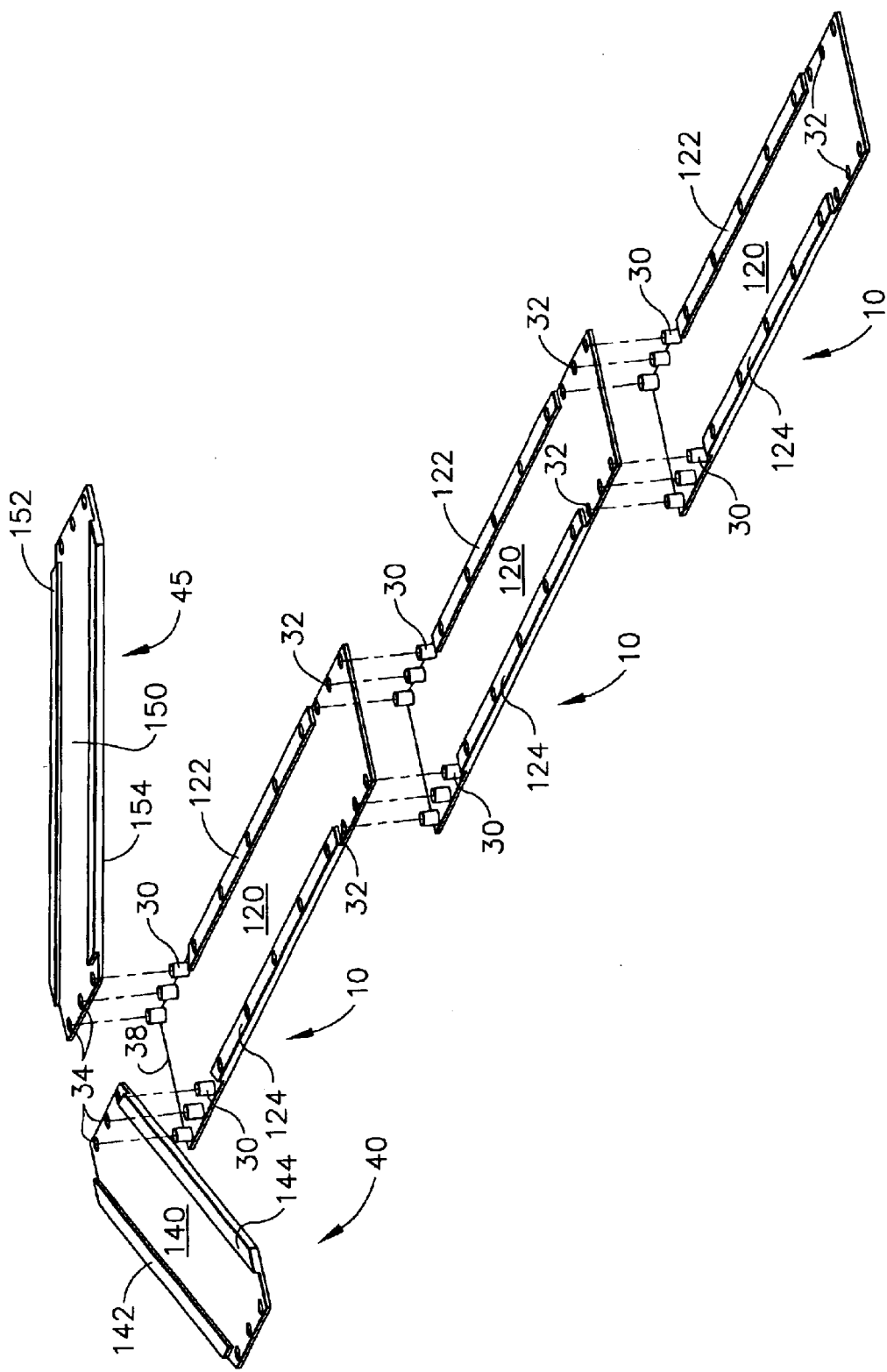
FIG. 5 is a perspective, exploded view of the main structural members of the elongated highly reflective arrowhead sign of FIG. 3.

Referring now to FIG. 5, the individual members of the elongated arrowhead sign are illustrated in an exploded view, such that each of the members can be seen in a perspective setting. As can be seen in FIG. 5, each of the "main" members 10 exhibits six locating pins 30 and six locating holes 32, and also exhibits two elongated and raised edges 122 and 124. These raised edges will create an interior longitudinal edge that will define the planar area 120 of each of the "main" members 10, which can be used to locate the adhesive retroreflective tape 20 when it is time for that adhesive tape or sheeting to be attached to planar surface 120.

In a similar manner, both of the "side" members 40 and 45 also exhibit raised longitudinal edges, to define interior longitudinal edges that define a planar area 140 or 150 of each of these members 40 and 45. In the case of the side member 40, the two raised longitudinal edges are depicted at 142 and 144, and the planar surface is at 140. In the case of the side member 45, the two raised longitudinal edges are depicted at 152 and 154, while the planar area is depicted at 150.

Figure 6:
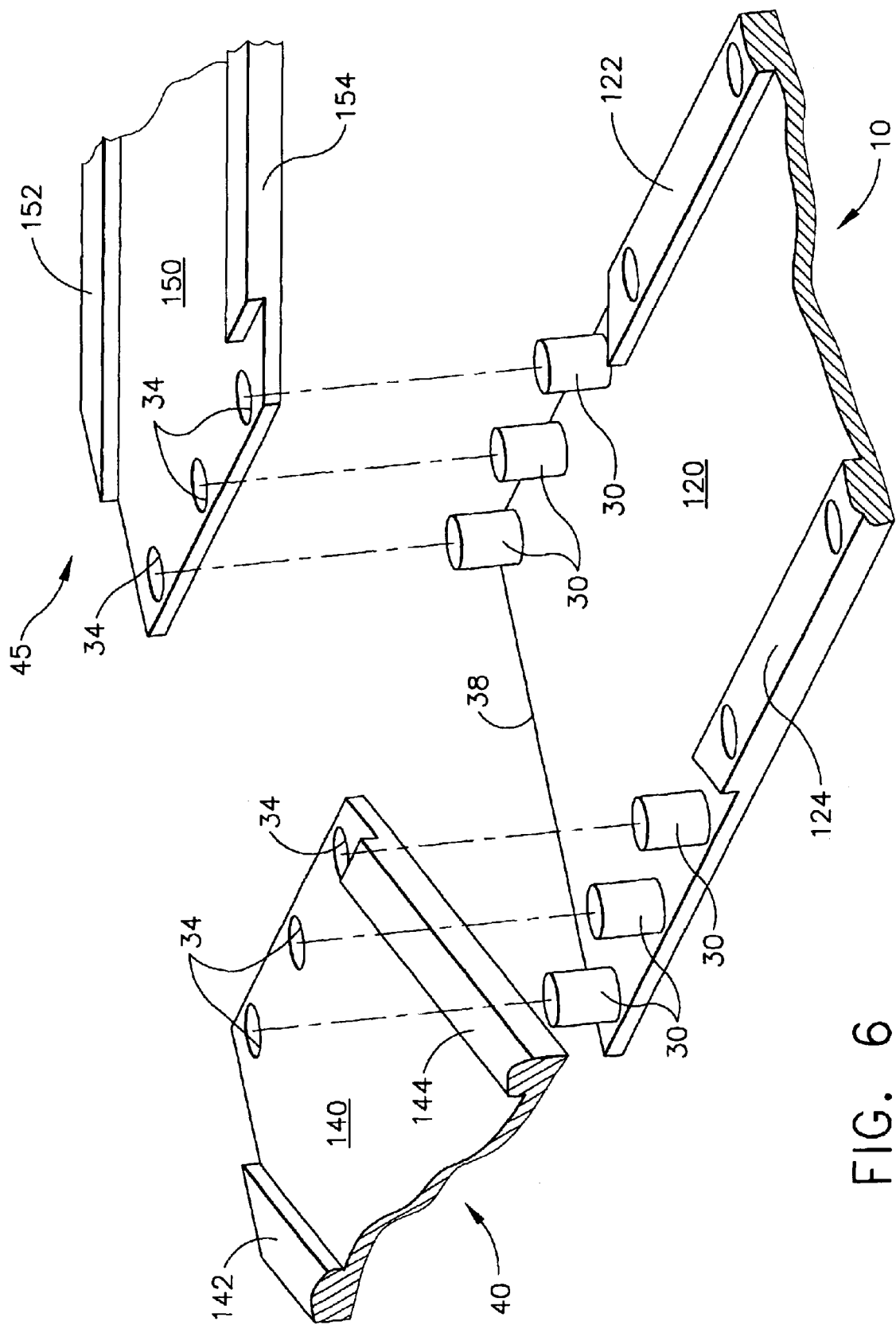
FIG. 6 is an enlarged perspective, exploded view of the junction between a "main" member and the two side or "wing" members of the elongated highly reflective arrowhead sign of FIG. 5.
Figure 7:
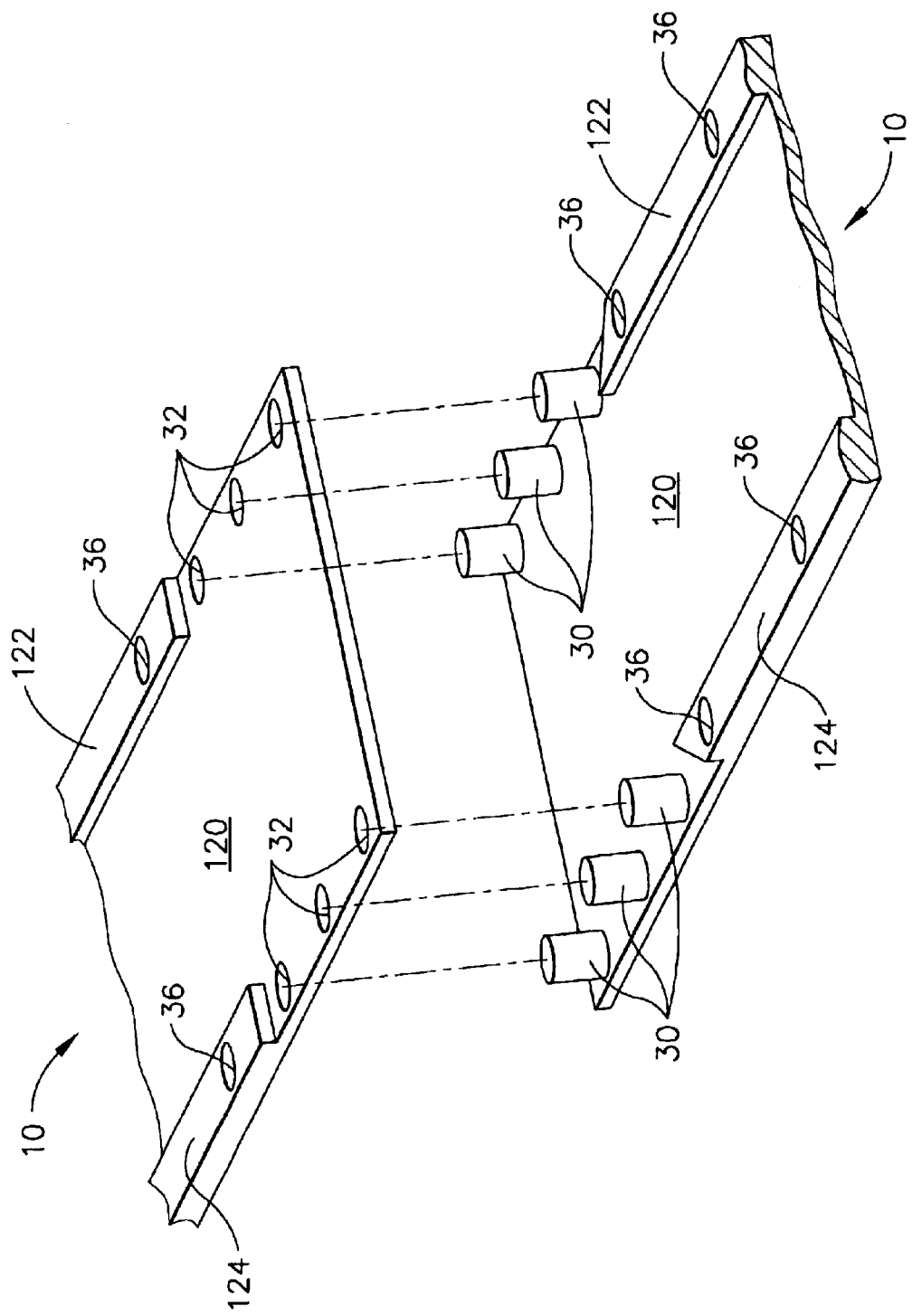
FIG. 7 is an enlarged perspective, exploded view of the junction between two "main" members of the elongated highly reflective arrowhead sign of FIG. 5.

FIGS. 6 and 7 show further details of these exploded views, showing the junctions of multiple members of the overall elongated arrowhead structure 70. In FIG. 6, the "tip" is illustrated at 38 of the "main" member 10, and the six locating pins 30 are easily seen. The two "side" members 40 and 45 are also illustrated, in which their locating holes 34 are easily seen. In FIG. 7, the junction between two of the "main" members 10 is illustrated, clearly showing the six locating pins or protrusions 30 and their mating locating holes or openings 32.

Figure 8:
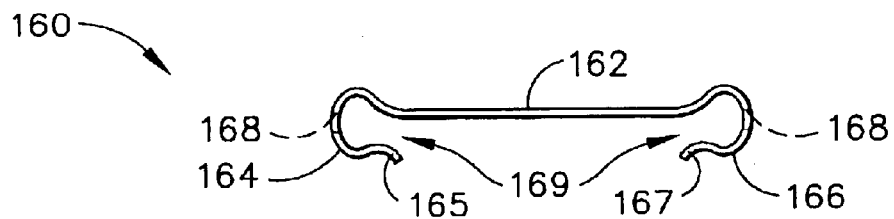
FIG. 8 is an end view of a "main" telescoping member used in a highly reflective arrowhead sign of a second embodiment, as constructed according to the principles of the present invention.

A second embodiment of the reflective arrowhead sign according to the present invention will now be described, beginning with FIG. 8. FIG. 8 illustrates a longitudinal member from one of its ends, in which the member itself is generally designated by the reference numeral 160. Longitudinal member 160 exhibits a substantially planar upper surface 162, and includes two longitudinal edges that border the planar surface 162, which are shaped as mainly circular formations at 164 and 166. These circular (or arcuate) edges 164 and 166 will retain an interior member that is placed within the spaces illustrated at 169. Each of these arcuate or circular edges 164 and 166 is made into a semi-circular shape of a sort, and they terminate at end points (or edges) 165 and 167, respectively.

The longitudinal element 160 also is provided with a number of openings or through-holes 168, which are placed in both of the arcuate longitudinal edges 164 and 166. These openings 168 will be more easily seen in other views.

Figure 9:
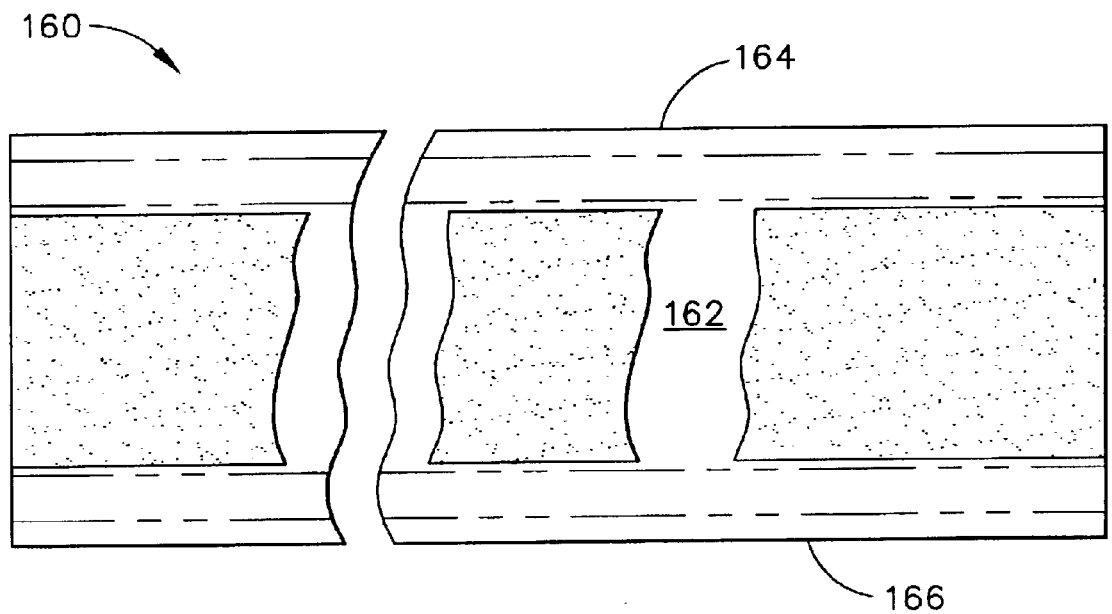
FIG. 9 is a front elevational view of the telescoping member of FIG. 8.

FIG. 9 illustrates the same longitudinal element 160 as illustrated in a view perpendicular to the substantially planar surface 162. In this view, the arcuate edge 164 runs along the upper portion of member 160, and the arcuate edge 166 runs along the bottom edge of member 160.

Figure 10:
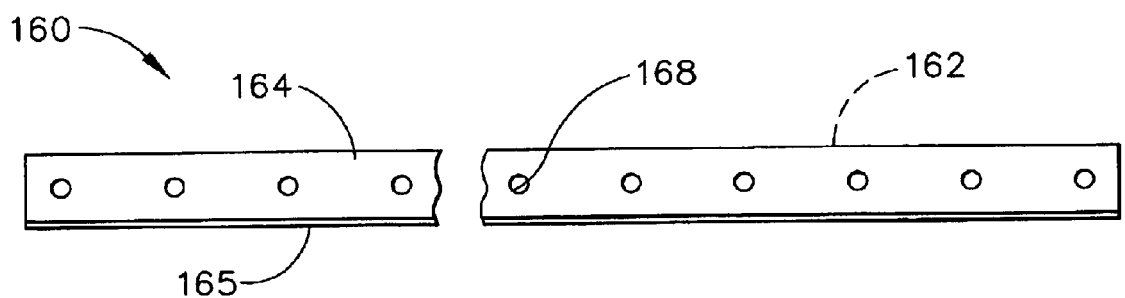
FIG. 10 is an edge view of the telescoping member of FIG. 8.

FIG. 10 illustrates the longitudinal member 160 from a side view, which better illustrates the openings or through-holes 168 in the arcuate edge 164. In FIG. 10, the substantially planar surface 162 cannot be seen, but it runs near the upper line (in this FIG. 10 view) of the arcuate edge 164. The termination edge 165 is visible in FIG. 10, and is seen along the bottom of member 160 in this view.

Figure 11:
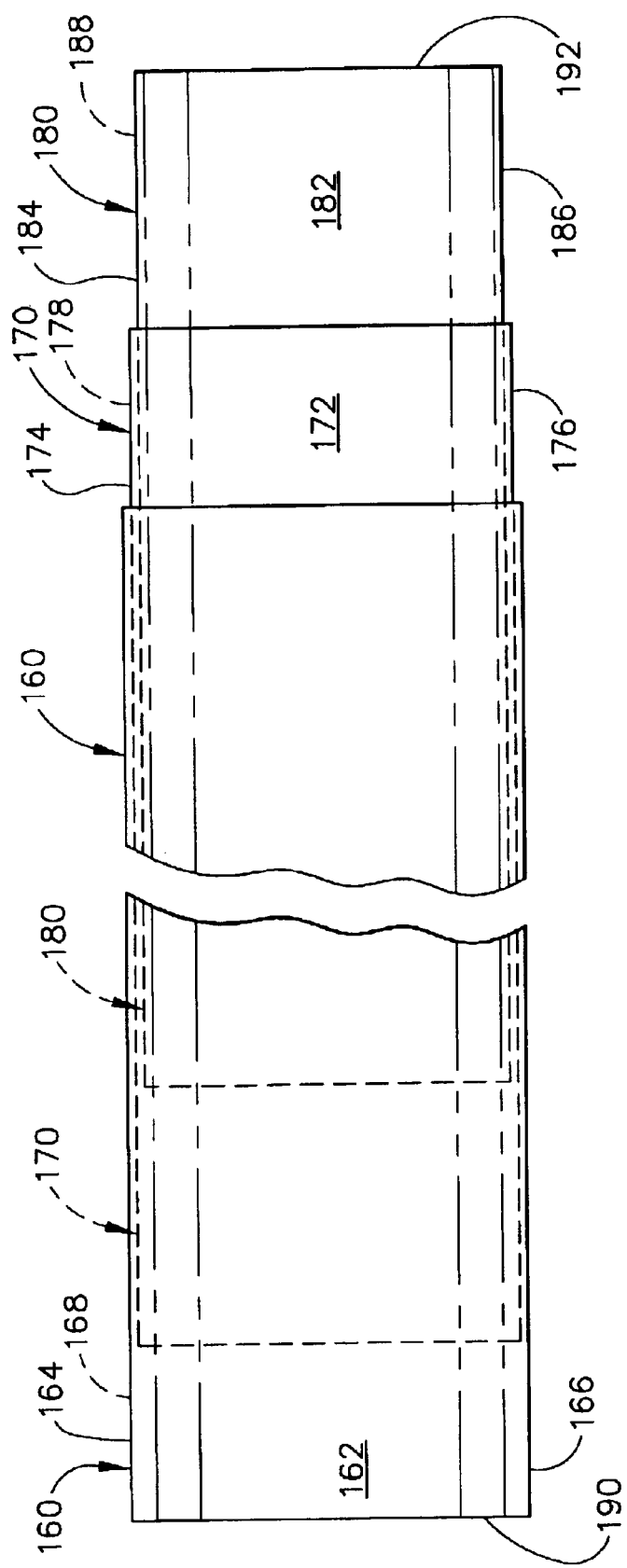
FIG. 11 is an elevational view of a three-piece telescoping arrangement that makes up a longitudinal member used in the second embodiment for a highly reflective arrowhead sign according to the principles of the present invention, and using the "main" member of FIG. 8.

Referring now to FIG. 11, it can be seen that the member 160 is used to form a multiple-member telescoping apparatus, in which member 160 is the largest in overall width, so that somewhat smaller similar longitudinal members can slide inside the space 169 and thus be moveably attached in a telescoping manner. The planar surface 162 is used as an attachment surface for highly reflective tape or sheeting material, such as the sheeting manufactured by 3M, described above. This highly reflective 3M sheeting is mainly retroreflective, although for the purposes of the present invention, a diffuse reflection material may also be satisfactory for certain applications. In general, however, a retroreflective surface is better suited for use as a traffic sign that is to exhibit high visibility, particularly at night when an approaching vehicle will illuminate the traffic sign with its headlights.

A second longitudinal member generally designated by the reference numeral 170 is slid inside the arcuate edges 164 and 166 of longitudinal member 160. Member 170 also exhibits two arcuate edges, at 174 and 176. Member 170 also exhibits a substantially planar surface at 172 for placement of a highly reflective or retroreflective tape or sheeting material. In addition, longitudinal member 170 will preferably have a series of openings or through-holes 178 placed into its arcuate edges 174 and 176 (or in at least one of these edges 174 or 176).

In a similar manner, the smallest (in width) longitudinal member illustrated in FIG. 11 is generally designated by the reference numeral 180. This longitudinal member 180 also exhibits a substantially planar surface 182 for placement of highly reflective or retroreflective tape or sheeting material. Member 180 also exhibits two longitudinal edges at 184 and 186.

The edges 164, 166, 174, 176, 184, and 186 could be substantially arcuate in shape, as described above, or they could just as easily be flat surfaces with straight edges, so long as they would tend to slide within the edges of the larger longitudinal members 160 and 170. The edges 164, 166, 174, 176, 184, and 186 will preferably include several openings or through-holes 168, 178, and 188, and so either an arcuate edge would be needed, or a right angle would have to be made along these longitudinal edges so that a small perpendicular member would extend and be perforated (or molded) as the openings/through-holes 168, 178, and 188.

In FIG. 11, the three longitudinal members 160, 170, and 180 are formed as a single overall member having a left edge (in this view) at 190, and a right edge (in this view) at 192. Since member 180 is smaller in width than either members 170 or 160, the "right" edge 192 is smaller in width than the "left" edge 190.

Figure 12:
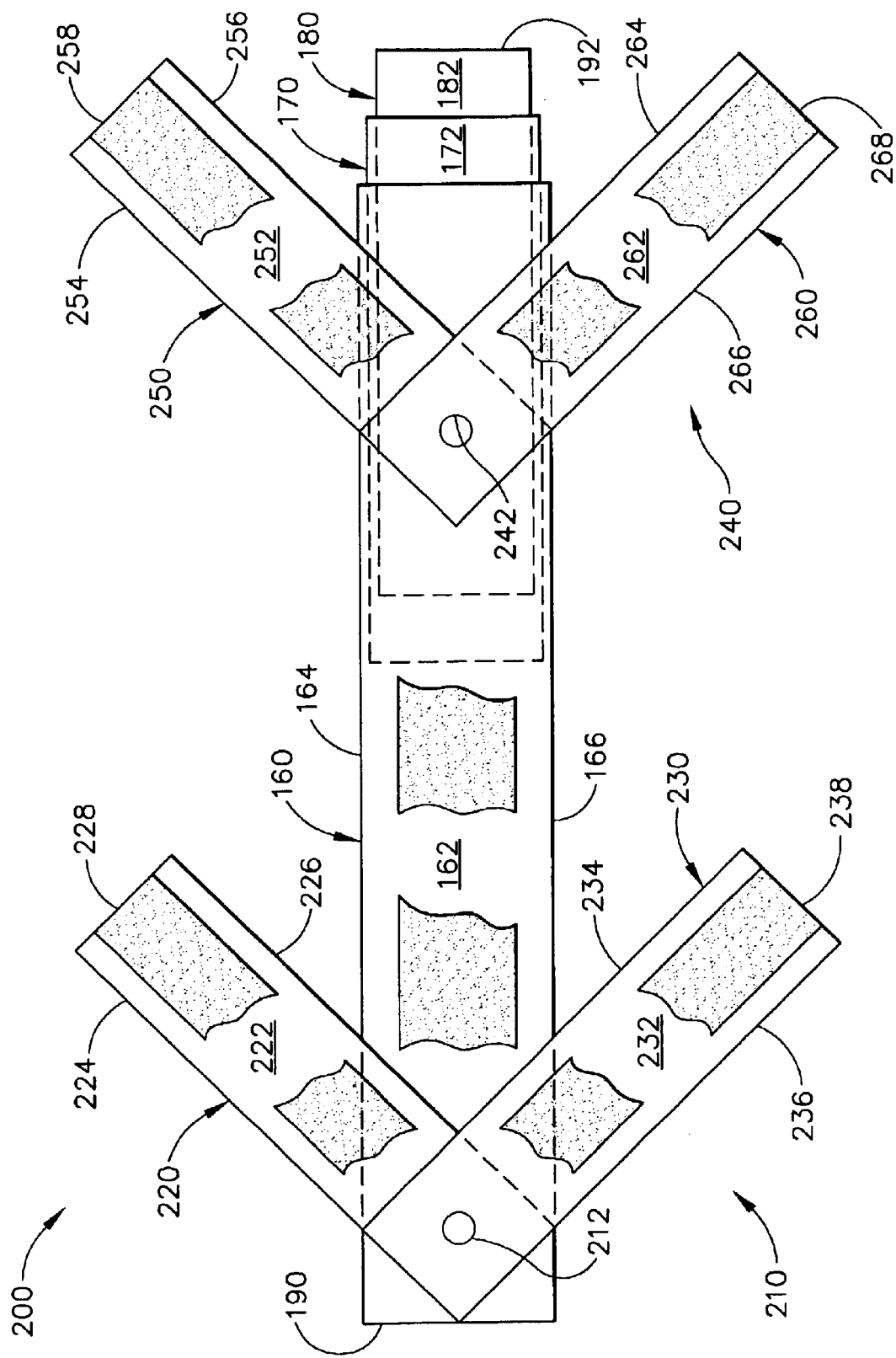
FIG. 12 is an elevational view of the reflective sign of FIG. 11, in which two wing sets that are pivotable about the main member have been attached, thereby making a complete assembly of the second embodiment, according to the principles of the present invention.

Referring now to FIG. 12, a reflective arrowhead sign, generally designated by the reference numeral 200, is illustrated as having a "main" longitudinal member and two sets of "wing" members that are pivotable and attached to the "main" longitudinal member. Reflective sign 200 is composed of the longitudinal members 160, 170, and 180, as described above in reference to FIG. 11. In this view of FIG. 12, the three longitudinal members are not extended, and the "smaller" members 170 and 180 are retracted (or telescoped "in") so that they are mainly inside the largest of the horizontal longitudinal members 160.

In FIG. 11, the main longitudinal member 160 has two pivot pins 212 and 242 that are located in openings through the planar surface 162. The two sets of rotatable "wings" are attached to these pivot pins 212 and 242. The first set of wings is generally designated by the reference numeral 210, and is attached to the pivot pin 212. The second set of wings is generally designated by the reference numeral 240, and is attached to the pivot pin 242. Of course, wing sets 210 and 240 could be rigidly attached to mounting points at 212 and 242, if desired, and as such, do not necessarily have to be pivotable.

The left set of wings 210 (as seen on FIG. 12) is composed of two separate wing members 220 and 230. Wing member 220 exhibits a substantially planar surface 222, which is of a characteristic so that highly reflective or retroreflective tape or sheeting material can be placed thereon. The wing 220 has two longitudinal edges 224 and 226, and a transverse end edge at 228. A similar wing 230 exhibits a substantially planar surface 232 for placement of highly reflective or retroreflective tape or sheeting material. Wing member 230 has two longitudinal edges 234 and 236, and a traverse end edge 238.

The right (in FIG. 12) wing set 240 is comprised of two wing members 250 and 260, which each pivot about the pivot pin 242. Wing member 250 exhibits a substantially planar surface 252 which is of a characteristic for placement or attachment of highly reflective or retroreflective tape or sheeting material. Wing 250 has two longitudinal edges 254 and 256, and a transverse end edge 258. A similar wing 260 exhibits a substantially planar surface 262 for placement or attachment of highly reflective or retroreflective tape or sheeting material. Wing 260 has two longitudinal edges 264 and 266 as well as a transverse end edge 268.

The reflective arrowhead sign 200 is designed so that the substantially planar surfaces that are viewable in FIG. 12 are to have very bright or highly reflective surfaces, such as that provided by the 3M tape described above. This 3M tape is actually retroreflective, although in some applications a highly reflective tape or even paint could be used, if desired. Such a highly reflective surface would not necessarily be retroreflective, but would at least provide diffuse reflection characteristics.

Figure 13:
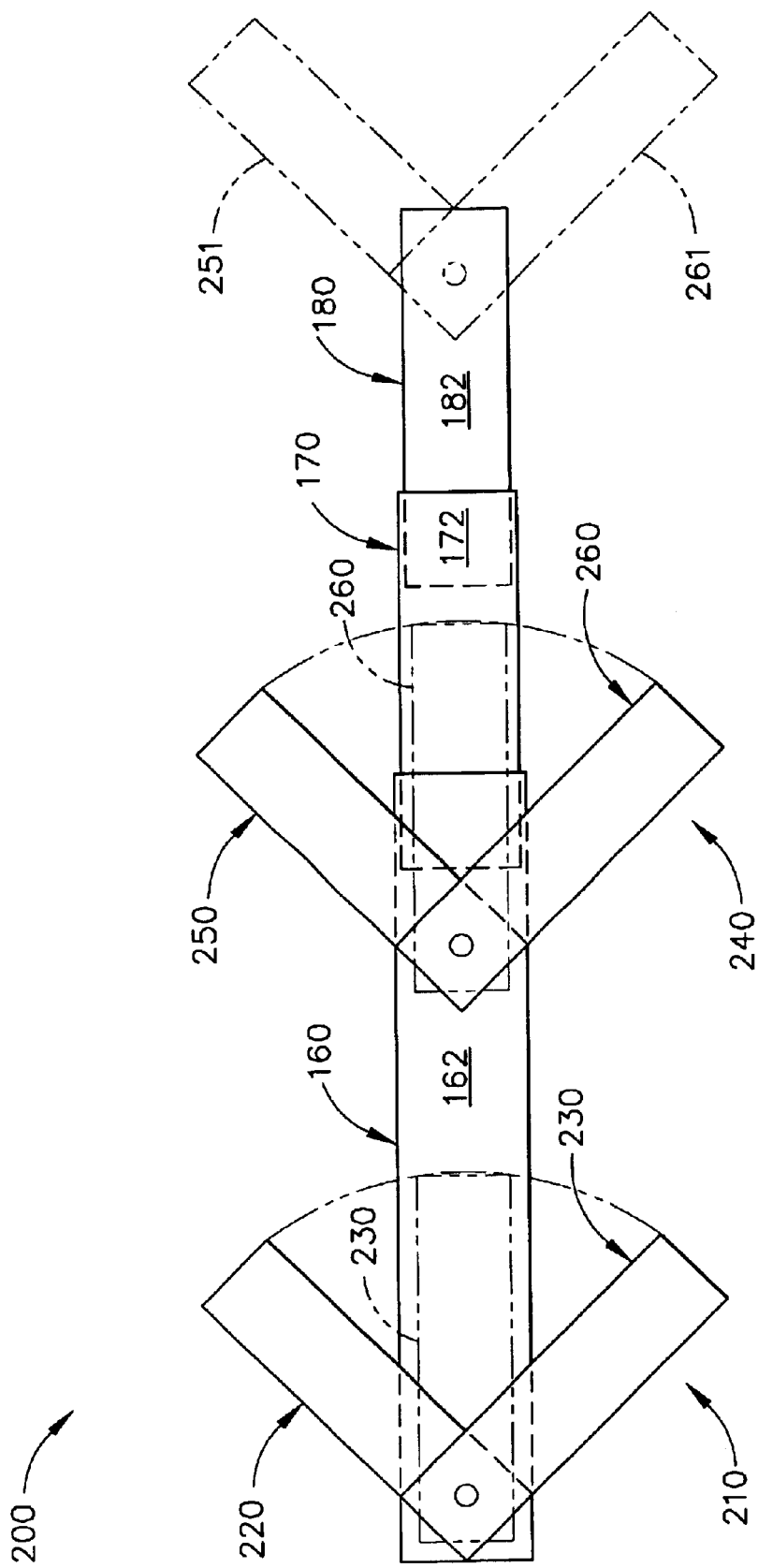
FIG. 13 is an elevational view of the highly reflective sign of FIG. 12, in which the telescoping members have been extended.

Referring now to FIG. 13, the reflective arrowhead sign 200 is illustrated in the extended telescoping position. As seen in FIG. 13, the slidable members 170 and 180 are extended out from the open end of the largest longitudinal member 160. This exposes the substantially planar surfaces 172 and 182 of these telescoping members 170 and 180. As discussed above, the planar surfaces 172 and 182 are designed so that a highly reflective or retroreflective tape or sheeting material can be placed thereon. This will provide a different overall shape to the arrowhead design of this embodiment 200 of the present invention. Of course, the wing members 210 and 240 could be located at different positions along the horizontal (as viewed in FIG. 13) line or longitudinal axis of the telescoping members 160, 170, and 180, all without departing from the principles of the present invention.

The arrowhead wing sets 210 and 240 can be pivoted to any position desired by the user, and can be pivoted so that they are substantially horizontal and will thus line up with the horizontal members 160, 170, and 180, for ease of storage. If desired, the pivotable wings 210 and 240 can be allowed to pivot 180 degrees, thereby allowing the sign to either point to the left or to the right, without changing the orientation of the telescoping members. Moreover, the left wing set 210 could point to the left, while the right wing set 240 could point to the right at the same time. This would allow the sign to point in both directions, thereby indicating that traffic should move to either left or right and avoid this lane.

It will be understood that the exact dimensions and angular relationships of the telescoping members and the wing members of the reflective arrowhead sign of the present invention could be altered without departing from the principles of the present invention. For example, the wing members 220 and 230 could form a different angle than that illustrated in FIG. 13. The same is true for the second set of wing members 250 and 260. Moreover, the ratio of horizontal distances (or lengths) of the three telescoping members 160, 170, and 180 could be significantly altered without departing from the principles of the present invention. In one embodiment of the reflective arrowhead sign 200, the tape or sheeting material applied to all of the planar surfaces is all of a single color, such as the yellow/green color that is available from 3M under the part numbers 3983 or 3963. However, one or more of the members of this arrowhead sign 200 could have a different color tape or sheeting material, if desired, without departing from the principles of the present invention.

It should be noted that the "second" wing set 240 could be attached to the reflective sign 200 on a different horizontal member. For example, a set of similar wings could be pivotally mounted on member 180, as illustrated in dashed lines at 251 and 261 on FIG. 13. In that circumstance, it would be best if wings 251 and 261 are narrow enough and thin enough to be slidable within the telescoping member 170. As an option, the "second" wing set 240 could be considered an optional feature, and left off of the reflective arrowhead sign altogether. In that circumstance, the "first" wing set 210 would also be the only wing set on the entire sign 200.

Figure 14:
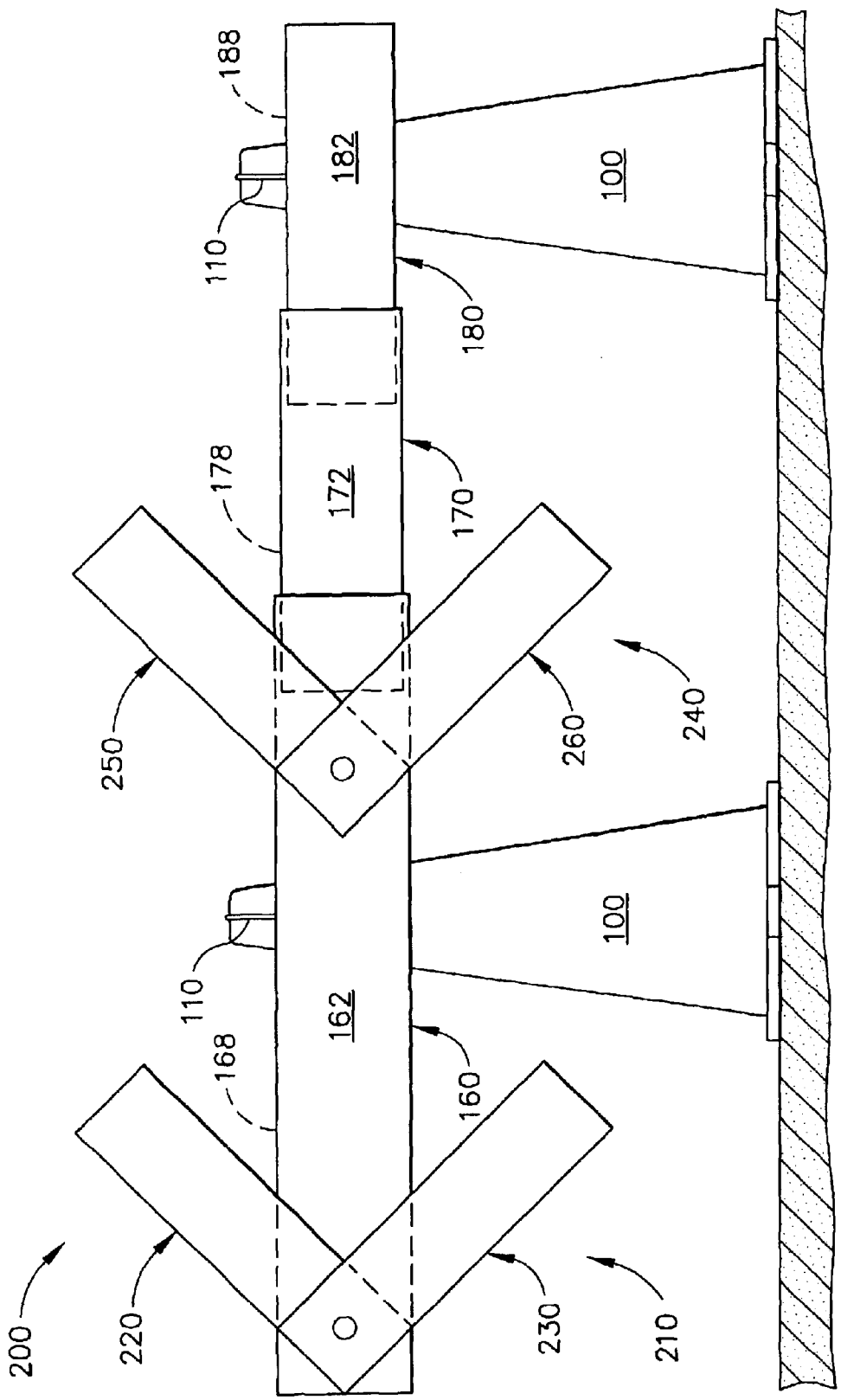
FIG. 14 is the highly reflective arrowhead sign of FIG. 13 with extended telescoping members, which is held in place by a pair of traffic cones and hooks over a road surface.

Referring now to FIG. 14, the telescoping reflective arrowhead sign 200 is illustrated as being mounted along the sides of two traffic cones 100. Each of the traffic cones 100 has a top opening, and an S-shaped hook 110 protrudes out the top and down along the side surface of each of the cones 100. The bottom portion of the S-hook 110 protrudes through one of the holes or openings 168, 178, or 188 of the horizontal telescoping members 160, 170, or 180, respectively. In this manner, the reflective arrowhead sign 200 can be mounted above the road surface, so as to be more easily seen by oncoming traffic.

Figure 15:
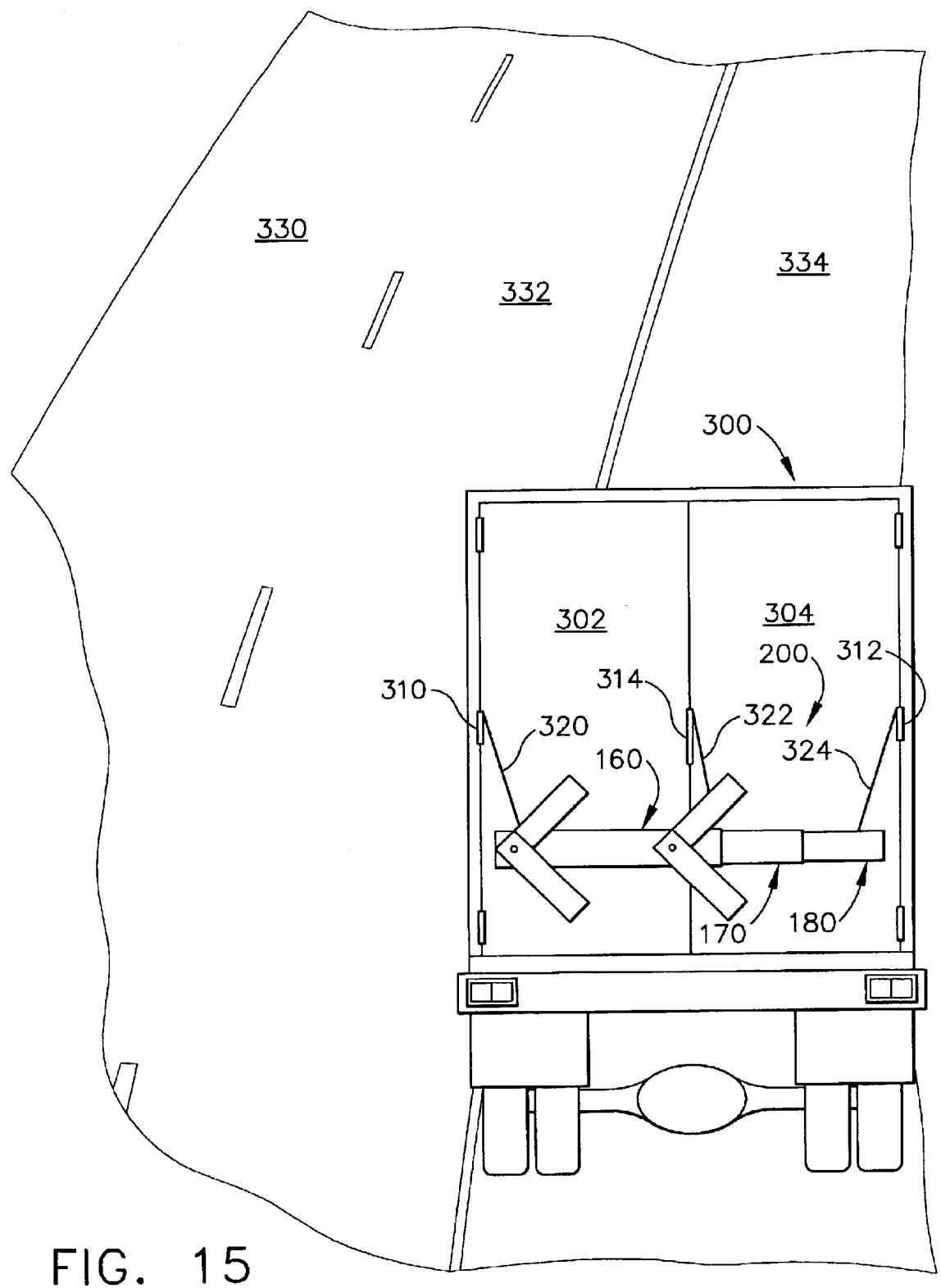
FIG. 15 is an elevational view of the reflective traffic sign of FIG. 13, as it is suspended from the rear doors of a tractor-trailer sitting along a road surface.

Referring now to FIG. 15, the reflective arrowhead sign 200 is illustrated as being mounted upon the rear doors of a tractor-trailer 300 that is parked along the side of a road. The rear doors 302 and 304 of the trailer have hinges at 310 and 312, as well as a handle at 314. Strings or wires can be hung from these locations to hold the reflective arrowhead sign 200 along the back surface of the doors. In FIG. 15, the string or wire is illustrated at 320, 322, and 324. Of course, this string or wire would be attached through some of the through-holes 168, 178, or 188 of the arrowhead sign 200. In FIG. 15, the tractor-trailer is illustrated as being parked along the shoulder 334 of a two lane highway, in which the two lanes are at 330 and 332.

Figure 16:
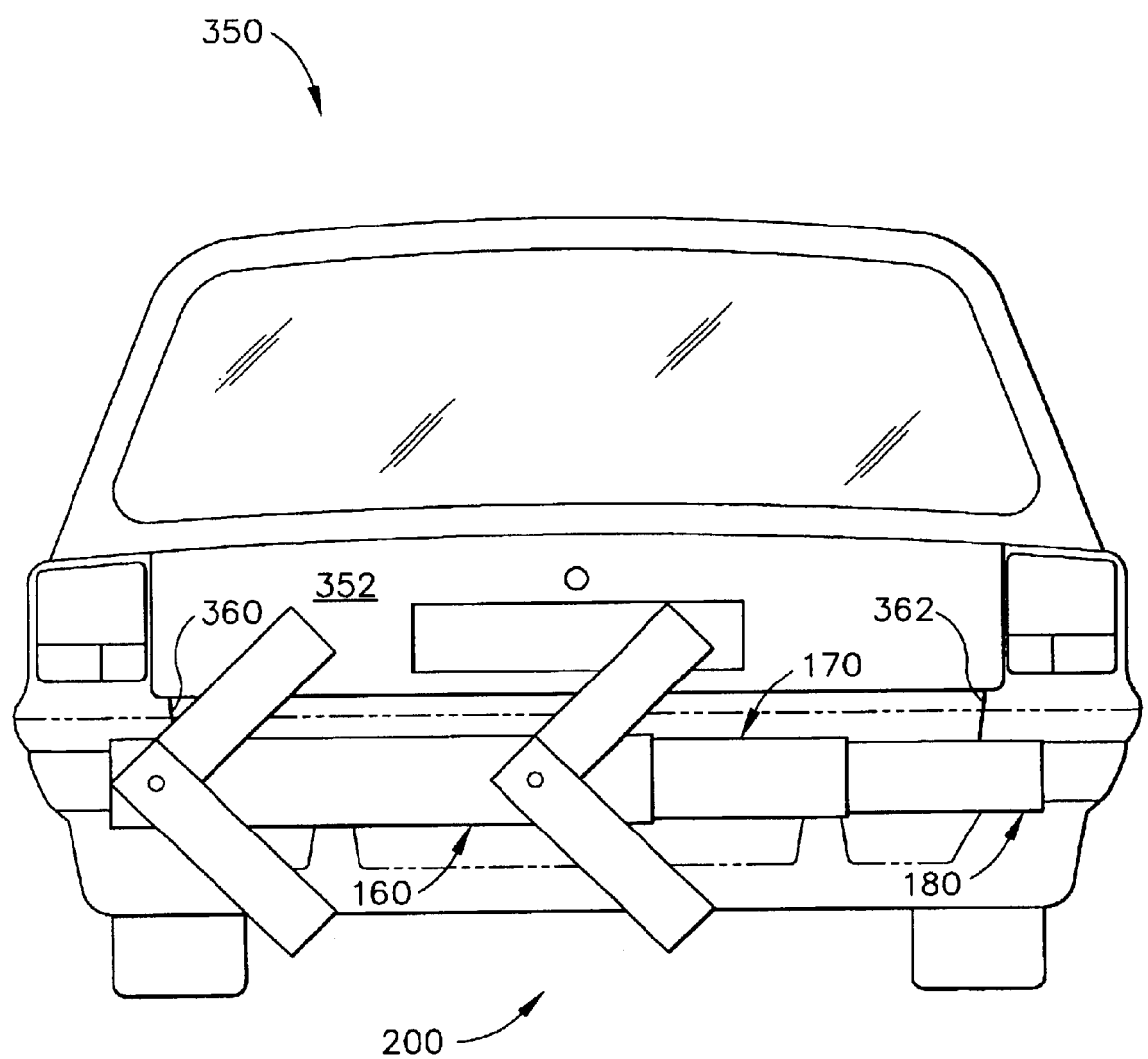
FIG. 16 is an elevational view of the reflective arrowhead sign of FIG. 13, as it is attached from the trunk of an automobile.

Referring now to FIG. 16, the reflective arrowhead traffic sign 200 is illustrated as being attached to the rear of an automobile 350. The trunk lid 352 of the automobile is closed, however strings or wires 360 and 362 have previously been run from some of the openings or through-holes in the arrowhead sign 200 to some type of attachment point inside the trunk. The trunk lid 352 can then be closed (or it could be left open, if desired).

Figure 17:
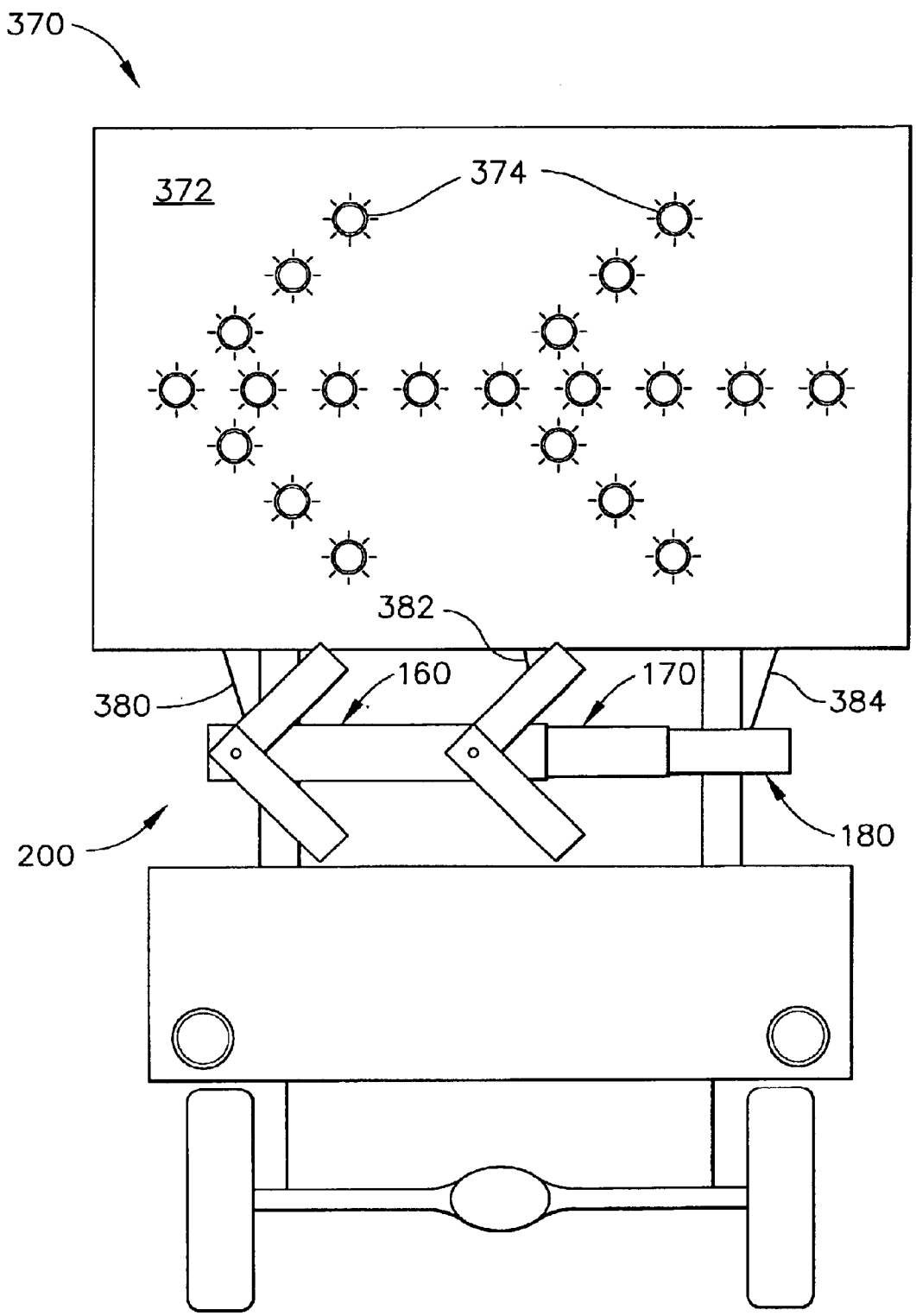
FIG. 17 is the reflective traffic sign of FIG. 13 as it is suspended from an illuminated highway directional sign that can be transported where needed.

Referring now to FIG. 17, the reflective arrowhead traffic sign 200 is shown mounted beneath an illuminated larger traffic sign 370. The illuminated traffic sign 370 exhibits a large planar surface 372 and multiple indicating lamps 374. These lamps could be continuously on, or they could blink or flash in sequence, if desired. Such devices are well known in the art. The reflective sign 200 could be used as a back-up safety sign, either for day or night use, in case the electrical power supply for the illuminated sign 370 fails. Or, by design, the lights could be turned off in the illuminated sign 370 during certain hours of the day or night, and this would then place sole traffic control in the lap of the reflective arrowhead sign 200. In FIG. 17, strings or wires 380, 382, and 384 are used to suspend the arrowhead sign 200 from the upper illuminated sign 370.

It should be noted that all of the "main" members and "wing" members depicted in FIGS. 8–17 can be manufactured of plastic, using an extrusion process. This is considerably less expensive than paying for injection molds needed for typical plastic injection processes.

Figure 18:
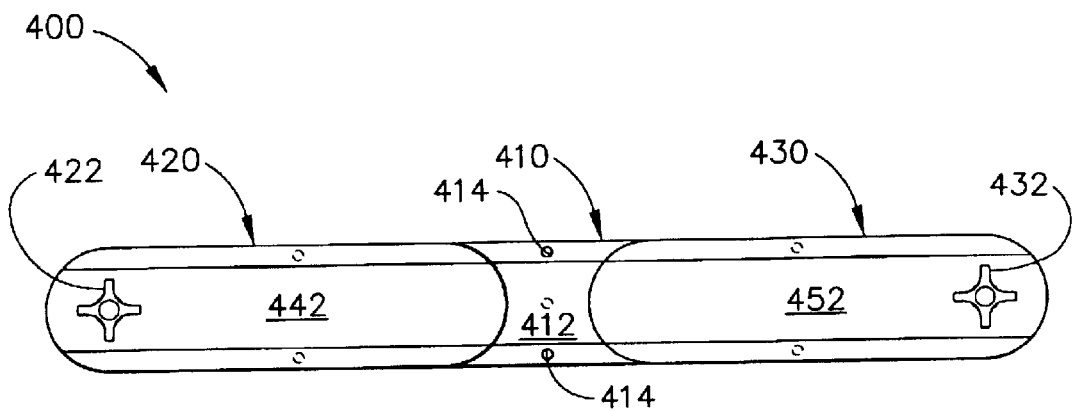
FIG. 18 is an elevational view of a third embodiment of a highly reflective arrowhead traffic direction sign, as constructed according to the principles of the present invention, in which the wing members that make up the arrowhead are pivoted to a neutral position along the longitudinal axis of the main member.

Referring now to FIG. 18, another alternative embodiment generally designated by the reference numeral 400 is illustrated as having a "main" horizontal member 410 and two sets 420 and 430 of "wing" members. Wing sets 420 and 430 are pivotable about pivot points that are created by use of pivot pins at locations where there are thumbscrews 422 and 432, respectively. Each of the members of the apparatus 400 have substantially planar surfaces for attachment of highly reflective or retroreflective tape or sheeting material, so they will be highly visible from a distance. The horizontal main member 410 exhibits a series of openings or through-holes at 414, and it is preferred that these through-holes 414 are spaced apart from one another along both the top and bottom longitudinal edges, as illustrated on FIG. 18 (or at least along the top longitudinal edge).

Figure 19:
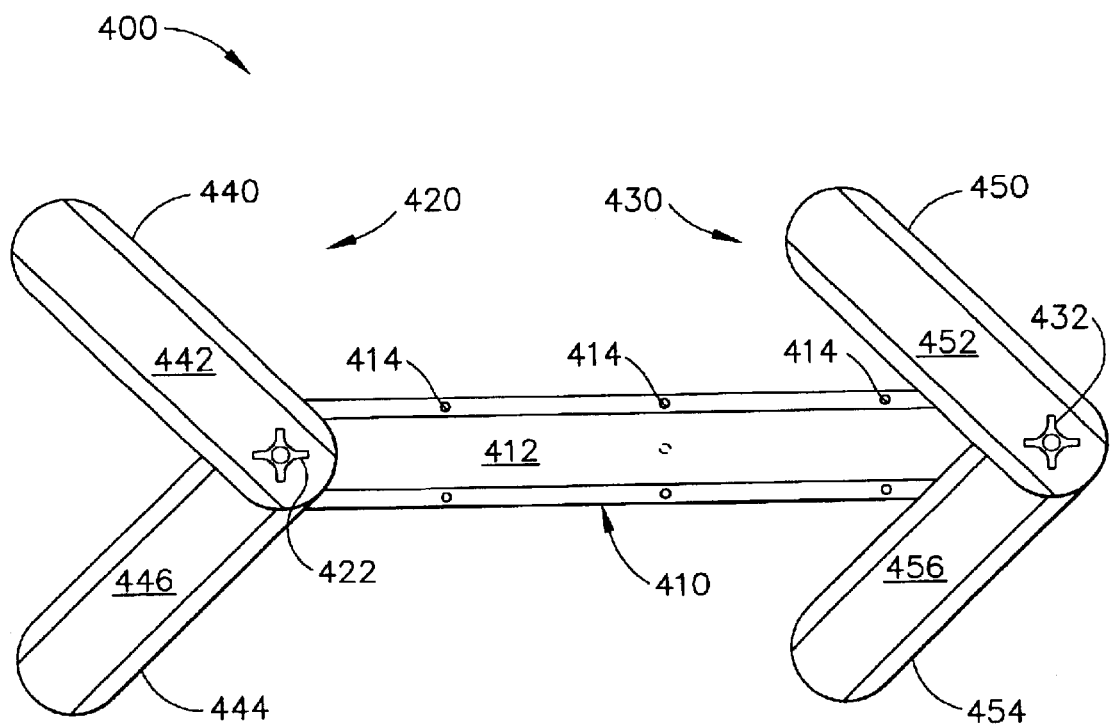
FIG. 19 is an elevational view of the reflective arrowhead sign of FIG. 18, in which the two wing sets are extended such that they have been pivoted to point to the right.

In FIG. 19, the reflective arrowhead sign apparatus 400 is illustrated in a position where the wings 420 and 430 have been "unfolded" in a manner such that their individual members have been rotated about their pivot points at 422 and 432. The wing set 420 is comprised of two separate wing members 440 and 444, each having a substantially planar surface at 442 and 446, respectively. This substantially planar surface is used for placement of the highly reflective or retroreflective tape or sheeting material, such as the 3M sheeting discussed above.

A similar wing set 430 is comprised of two wing members 450 and 454, each having a substantially planar surface at 452 and 456, respectively, for placement of highly reflective or retroreflective tape or sheeting material, such as the 3M material discussed above. In FIG. 19, the wing set 430 forms an arrowhead tip-shape, the wing set 420 forms an arrowhead tail feather-shape, and the "main" member 410 forms the arrow shaft-shape. In the illustrated positions of FIG. 19, it can be easily seen that wing members 440, 444, 450, and 454 extend beyond the outer longitudinal edges of the "main" member 410.

Each of the wing sets 420 and 430 are pivotable about a pivot point, as noted above. In this alternative embodiment 400, the pivot point is composed of an opening in the main member 410, and a pivot pin and thumbscrew combination, in which the thumbscrew is visible in FIG. 19 at 422 and 432 for the wing sets 420 and 430, respectively. It will be understood that the actual angular position of the individual wings 440, 444, 450, and 454 can be determined by the user, who first loosens the thumbscrews 422 and 432, and then moves in a rotatable manner the individual wings of the wing sets 420 and 430. Once the wing sets are adjusted so that their members 440, 444, 450, and 454 are positioned in the desired locations, then the thumbscrews 422 and 432 can be re-tightened to hold the wing sets 420 and 430 in their desired placement.

The main member 410 also has a substantially planar surface at 412 for placement or attachment of highly reflective or retroreflective tape or sheeting material, such as the 3M material described above. This will allow all of the main members of the reflective arrowhead sign 400 to be very highly visible from a distance, both during the daytime and at night. When an oncoming vehicle shines headlights onto the reflective arrowhead sign, a large percentage of light will be reflected back to the driver of the vehicle. The members 410 and wing sets 420 and 430 can either have retroreflective surfaces or highly reflective surfaces that will reflect in a diffuse manner, as desired by the designer of the reflective arrowhead sign. In general, it is preferred that the reflective portions of these members comprise retroreflective material, so that light that is emitted by headlights of an oncoming vehicle will be substantially re-directed back toward the driver of that vehicle, instead of being diffusely reflected at a different angle. Of course, reflective angles can also be altered by changing the shapes of the "planar" surfaces, as discussed below.

Figure 20:
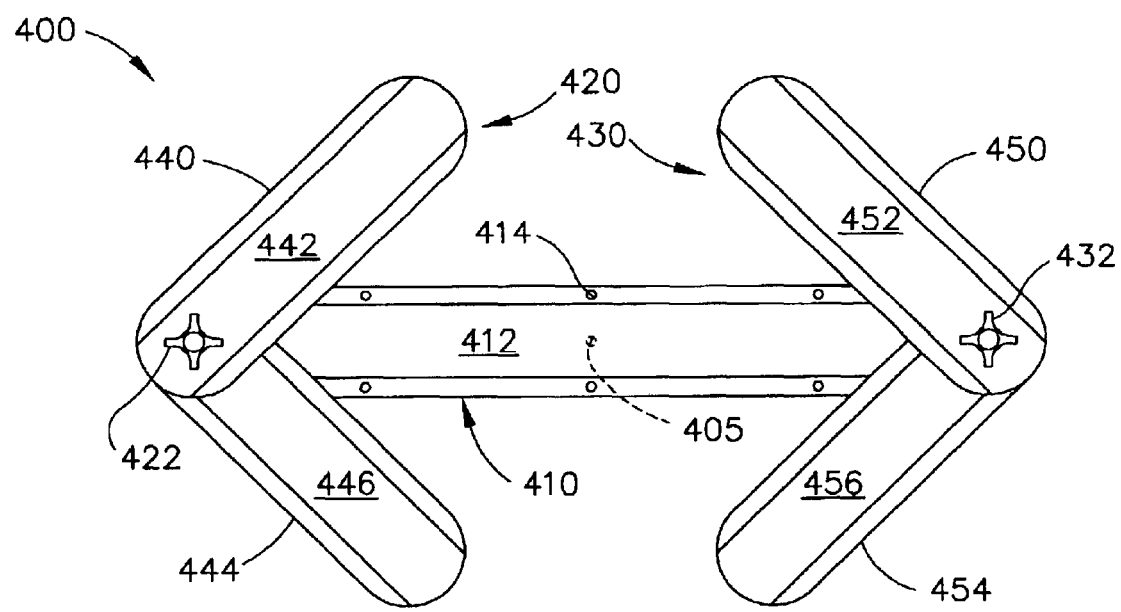
FIG. 20 is an elevational view of the reflective arrowhead sign of FIG. 18, in which the two wing sets have been pivoted so as to point in opposite directions, thereby informing oncoming traffic that they should choose a lane either to the left or to the right of the sign.

Referring now to FIG. 20, the reflective arrowhead sign 400 is depicted in a manner such that its wing sets 420 and 430 are pointing in opposite directions, thereby indicating that oncoming traffic should either move to the left or to the right to avoid this particular lane. The same main member 410 is again used, as well as the same wing members that make up the wing sets 420 and 430. As in a manner described above, the user merely loosens the thumbscrews 422 and 432 and rotates the individual wing members of wing sets 420 and 430 to the desired positions, and the result is the type of sign that indicates a closed lane, rather than indicating that traffic should move either to the left only or to the right only, which would be the type of indication of the sign illustrated in FIG. 19. In this configuration, the reflective sign 400 exhibits a "double arrowhead-style" pointing shape. (There is no "tail feather" portion in this arrangement.) As noted above, the individual wing members of the wing sets can be adjusted to virtually any rotatable angle about the pivot points of the main member 410, and then locked in that position merely by re-tightening the thumbscrews 422 and 432.

Figure 21:
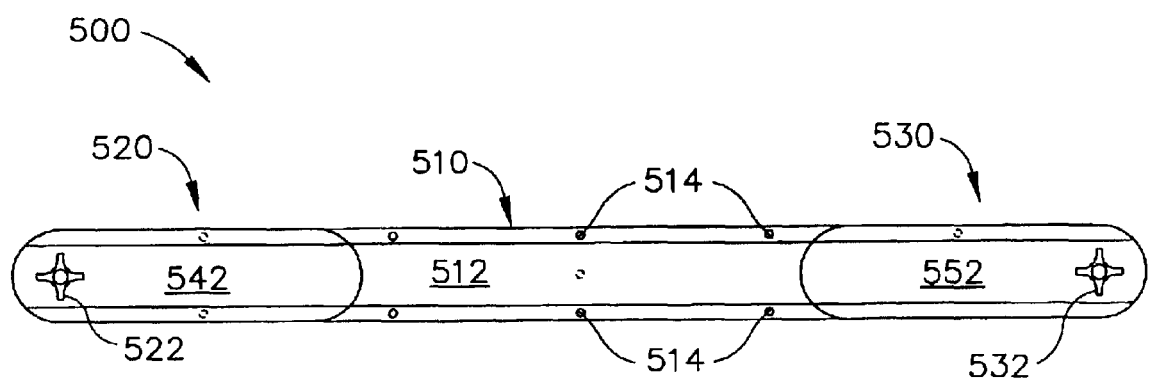
FIG. 21 is a plan view of the third embodiment of a reflective arrowhead sign of the present invention, in which the main member is longer than that of FIG. 18, but using similar wing set members which are pivoted to their neutral position along the centerline or longitudinal axis of the main member.

The precise dimensions of the various members that make up the reflective arrowhead sign 400 can be altered as per the designer's discretion, and in one embodiment, the main member 410 can be made to a length of twenty-four inches. In FIG. 18, if the overall width of the main member 410 is approximately twenty-four inches, then each of the wing members of the wing sets 420 and 430 are approximately eleven inches in length. This allows plenty of space in the center of the main member 410 for the individual wing members to be folded back into position along the horizontal length (in this view) of the main member 410. This results in the structure illustrated in FIG. 20, which is depicted somewhat to scale with regard to the ratio of lengths of the members. As an alternative, a longer "main" member could be used, and this would result in another alternative embodiment illustrated in FIG. 21, and generally designated by the reference numeral 500. In FIG. 21, the main member 510 is illustrated as being approximately thirty-six inches in length, while the individual wing members of the two wing sets 520 and 530 are still approximately eleven inches in length. This will, of course, leave a much larger open space in the middle of the main member 510 when the wing members are folded along the horizontal (in this view), longitudinal axis of main member 510.

Figure 22:
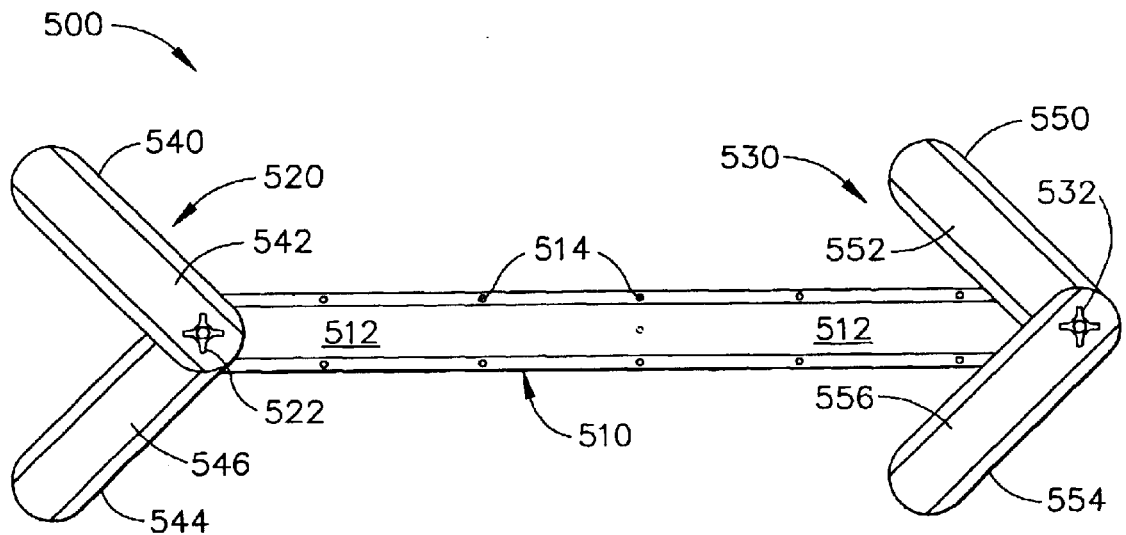
FIG. 22 is an elevational view of the elongated reflective traffic sign of FIG. 21, in which the arrowhead wing sets are both pointing to the right.

FIG. 22 illustrates the alternative embodiment 500 reflective arrowhead sign in its orientation that points to the right (as seen in this view), in which wing set 520 has its individual members viewable at 540 and 544. These two wing members have substantially planar surface areas 542 and 546 for placement of highly reflective or retroreflective tape or sheeting material. The wing set 530 has its individual members exposed in this view at 550 and 554, and each of these members has a substantially planar area at 552 and 556 for placement of the highly reflective or retroreflective tape or sheeting material. The main member 510 has a substantially planar area at 512 for placement of the same type of highly reflective or retroreflective tape or sheeting material. Of course, diffuse-reflecting material (or paint) could be used here.

The reflective arrowhead sign 500 has a series of mounting holes 514, that are spaced apart from one another, and these will be discussed in later views. There are two pivot points and wing nuts at 522 and 532.

Figure 23:
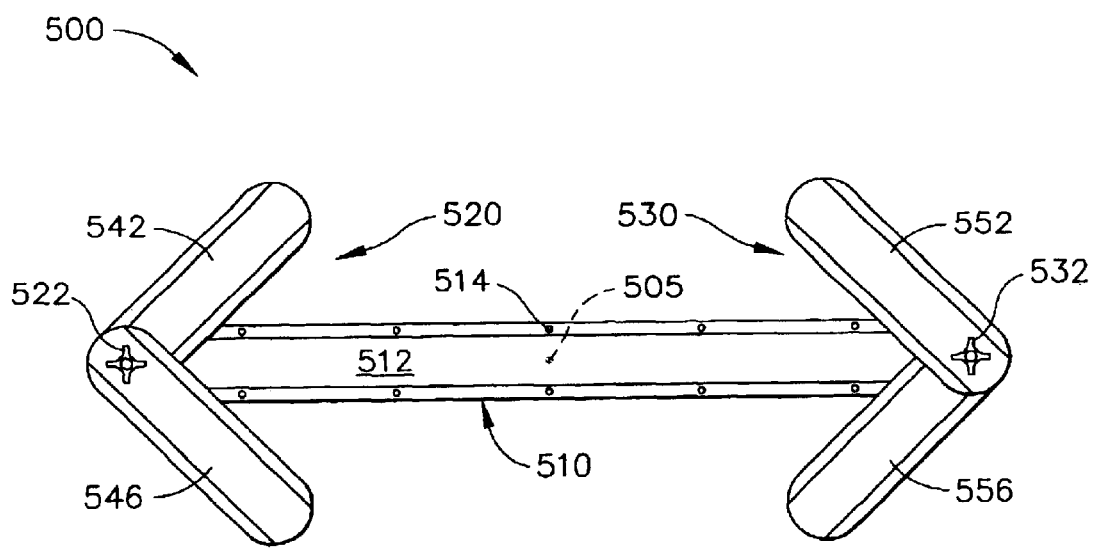
FIG. 23 is an elevational view of the reflective arrowhead sign of FIG. 21, in which the two arrowhead wing sets are pointing in opposite directions, similar to that of FIG. 20.

FIG. 23 illustrates another orientation of the reflective arrowhead sign 500, in which the wing sets 520 and 530 point in opposite directions so as to direct traffic away from this lane either to the left or to the right. As described above in reference to the reflective sign 400, the precise orientation of the wing sets 520 and 530 can be at any desired angle, and are easily pivoted after the thumbscrews 522 and 532 are loosened, and once placed in their correct rotational positions, the wing sets can then be fixed in place by re-tightening these thumbscrews.

Figure 24:
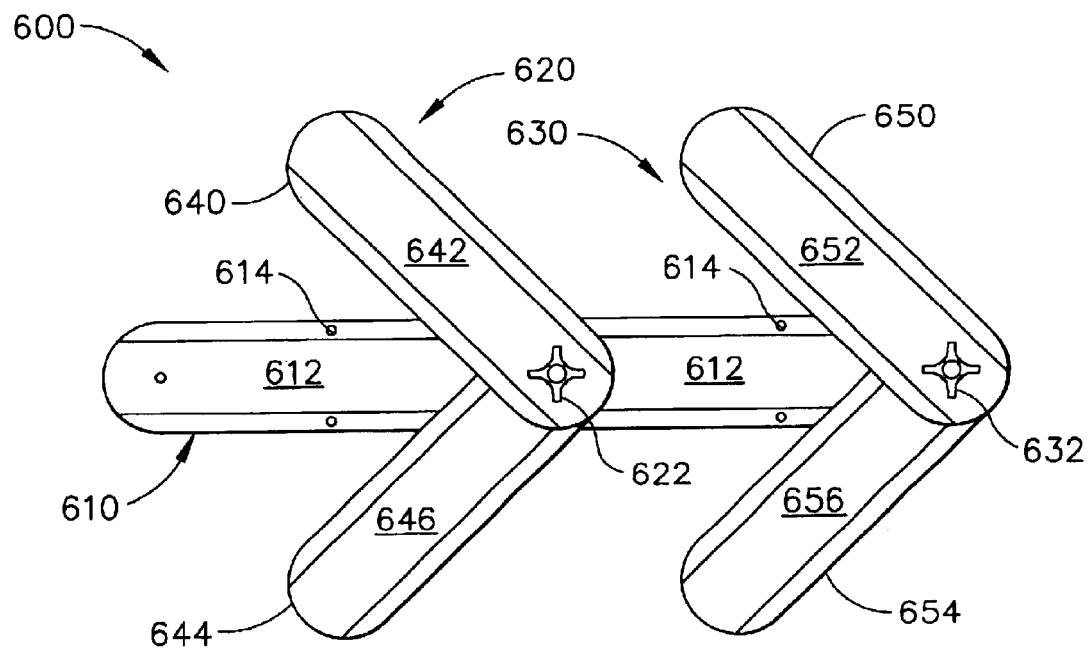
FIG. 24 is an elevational view of a fourth embodiment of a highly reflective arrowhead traffic direction sign, similar to that of FIG. 18; however, one of the wing sets is mounted about the mid-point of the main member, instead of being pivotable about one of its end points.

FIG. 24 illustrates an alternative construction or placement of the wing sets, and illustrates another embodiment of a reflective arrowhead traffic sign, generally designated by the reference numeral 600. A "main" member 610 is provided, and it is substantially the same as the main member 410 of FIGS. 18–20. Longitudinal member 610 includes a substantially planar surface 612 for placement of a highly reflective or retroreflective tape or sheeting material, such as the 3M material described above. Member 610 also exhibits a series of openings or through-holes 614 that are used for mounting the sign 600, as described below.

The two wing sets in embodiment 600 are located in an alternative position, in which the wing set 620 is mounted near the center of the longitudinal member 610, while the wing set 630 is still located along the right end (in this view) of the longitudinal member 610 (similar to the wing set 430 of FIG. 19). The pivot point for wing set 620 is illustrated at 622, and uses an opening 405 that is illustrated in FIG. 20. Opening 405 was not used in the embodiment 400 illustrated in FIG. 20, but in FIG. 24 it becomes the pivot point for the "middle" wing set 620, which pivots about a pivot pin and thumbscrew at 622.

Wing set 620 is composed of two wing members 640 and 644, each which have a substantially planar surface at 642 and 646, respectively, for placement of highly reflective or retroreflective tape or sheeting material. In a similar manner, wing set 630 is composed of two wing members 650 and 654, each of which have a substantially planar surface area at 652 and 656, respectively, again for placement of highly reflective or retroreflective tape or sheeting material. Wing set 630 uses a thumbscrew 632.

Figure 25:
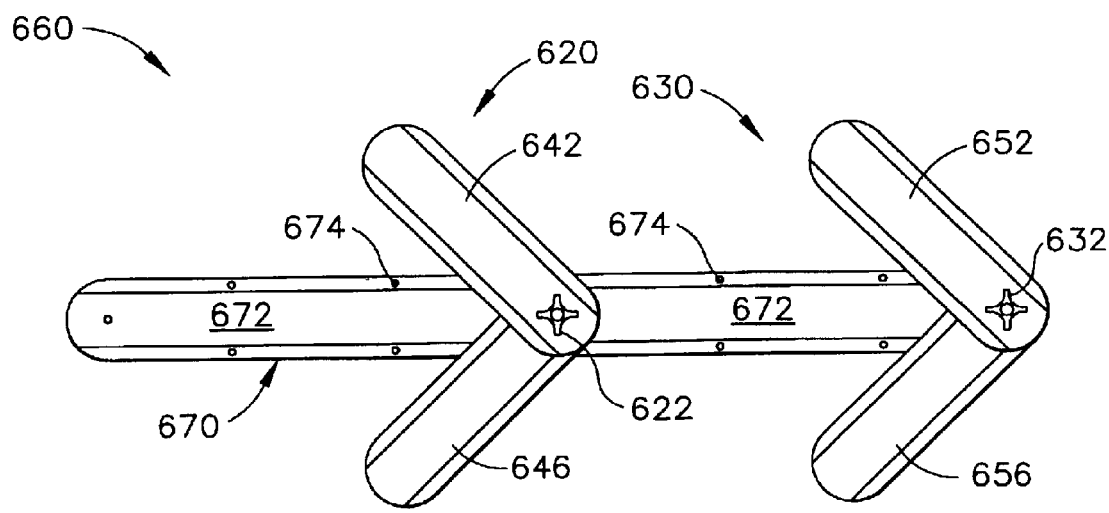
FIG. 25 is an elevational view of another embodiment of the reflective arrowhead traffic sign which is similar to the embodiment of FIG. 21, however, one of the wing sets is attached so as to be pivotable about the mid-point of the main member, instead of being pivotable about one of its end points.

FIG. 25 illustrates a similar "double arrowhead" design to that depicted in FIG. 24. In FIG. 25, the entire structure is generally designated by the reference numeral 660, and its "main" member 670 is longer than the horizontal member 610 of FIG. 24. As illustrated, it uses the same two wing sets 620 and 630. Wing set 620 is again composed of two wing members 640 and 644, each which have a substantially planar surface at 642 and 646, respectively, for placement of highly reflective or retroreflective tape or sheeting material. Wing set 630 is again composed of two wing members 650 and 654, each of which have a substantially planar surface area at 652 and 656, respectively, again for placement of highly reflective or retroreflective tape or sheeting material.

On FIG. 5, the wing set 620 is pivotable about a point that is near or at the center of the longitudinal "main" member 670. This point comprises a hole or opening 505 that can be seen on FIG. 23. The other wing set 630 is pivotable about the same hole that was used for wing set 530 on the embodiment 500 illustrated in FIG. 23. Using this alternative design for the embodiment 660, the reflective arrowhead sign will point to the right with both wing sets 620 and 630, and the "tail" (or "feather") wing set is located at the mid-point rather than at the end-point. Longitudinal or main member 670 includes a substantially planar surface 672 for placement of a highly reflective or retroreflective tape or sheeting material, such as the 3M material described above. Member 670 also exhibits a series of openings or through-holes 674 that are used for mounting the sign 660, as described below.

Figure 26:
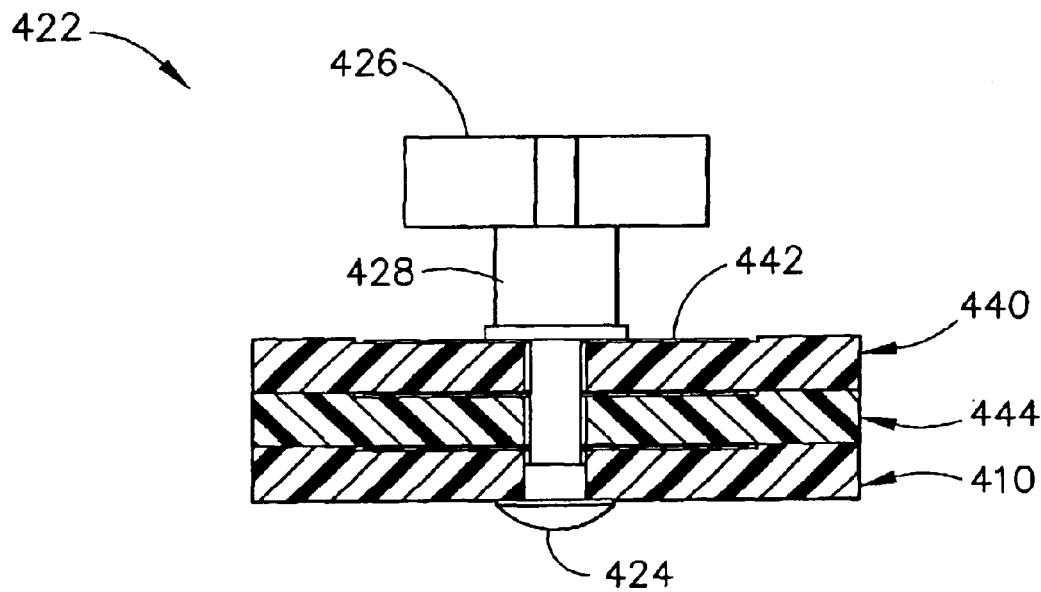
FIG. 26 is a cross-section view of one of the pivot points of the reflective sign of FIG. 18.

FIG. 26 provides a detailed view of one of the thumb-screws 422 used in the embodiment 400, illustrated on FIG. 18. The three layers of the main member 410 and two of the wing members are illustrated in cross-section, as well as the portions of the thumbscrew sub-assembly. The wing set 420 comprises the two wing members 440 and 444, which all pivot about the same point along the longitudinal axis of the main member 410. The pivot point is made up of a thumbscrew and bolt-type arrangement, in which a round-head screw or bolt 424 is positioned along the "back" side of the "main" member 410, and this bolt or set screw extends upward through the opening in all three of these pivotable members. The head of the thumbscrew is illustrated at 426, and an extension shaft at 428 separates the head 426 from the upper surface at 442 of the wing member 440. Another feature that can be seen in FIG. 26 is the substantially planar surface 442 that is made up of a highly reflective or retroreflective tape or sheeting material, as described above. As noted above and discussed below, these "planar" surfaces do not necessarily need to literally be flat.

Figure 27:
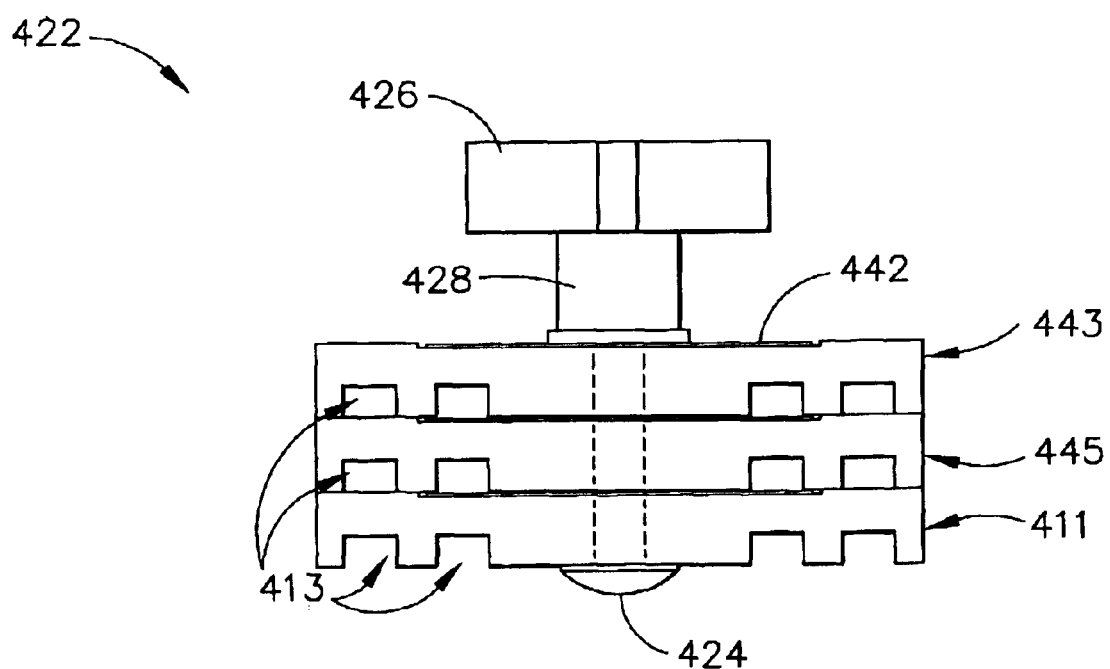
FIG. 27 is an end view of an alternative construction of the longitudinal members that make up the reflective traffic sign of FIG. 18.

FIG. 27 illustrates another arrangement of the members of the embodiment 400 illustrated in FIG. 18. In FIG. 27, the pivotable members and the "main" member each have longitudinal channels made in them, so as to save costs by reducing the amount of material needed to make up these members. In FIG. 27, the alternative "main" member is designated by the reference numeral 411, while the two wing members are designated 443 and 445. The "top" (in this view) member 443 still has a substantially planar surface 442 that uses the highly reflective or retroreflective tape or sheeting material. Each of the members 411, 443, and 445 have longitudinal channels at 413 formed therein. These channels can be made by a simple extrusion process, and can be made quite inexpensively by such a process. The same thumbscrew 422 is illustrated, which has the same head 426, offset shaft 428 and round-head screw or bolt 424.

The length of the structural members was discussed above, in which the main member of the reflective arrowhead sign was typically either twenty-four inches or thirty-six inches in length. The width of these same structural members will preferably be approximately three inches from edge-to-edge (when viewed in FIG. 18, from the "top" edge to the "bottom" edge). It would be preferred to extrude these structural members such that there is a shallow depression along the substantially planar surface where the tape or sheeting material is to be attached. When using the 3M material described above, the preferred dimensions would be 2-1/16 inch width for the substantially planar area that is somewhat recessed as compared to the longitudinal edges. If the part is to be symmetrical, this means that both edges would have a width of approximately 15/32 inches. The sheeting material sold by 3M is available in widths of two inches, and with their typical tolerance, the dimension of 2-1/16 inches width for the substantially planar surface should easily accommodate this 3M sheeting material.

Figure 28:
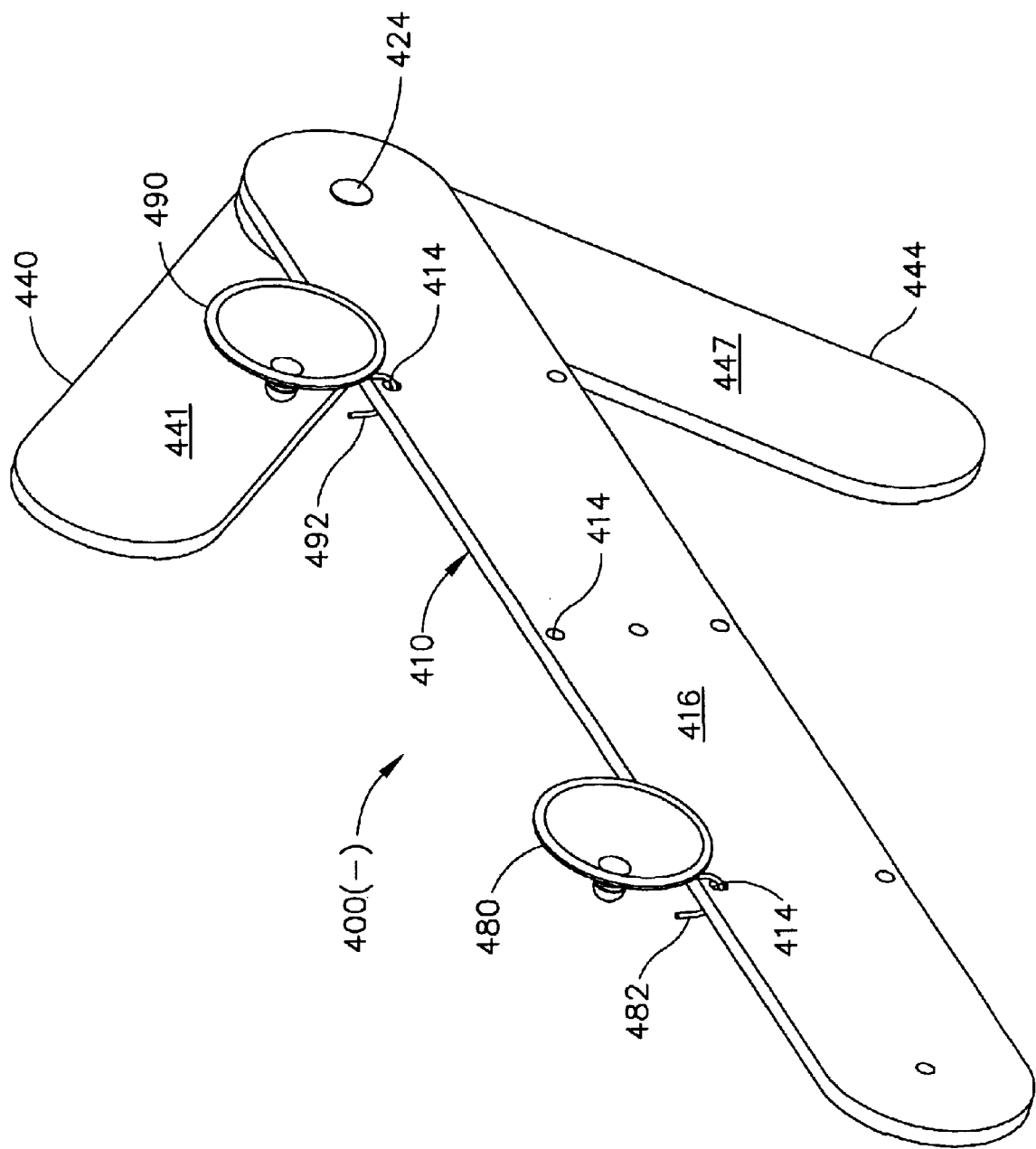
FIG. 28 is a perspective view from above and from the rear of the reflective arrowhead sign of FIG. 18.

Referring now to FIG. 28, a portion of the reflective arrowhead sign 400 is illustrated in perspective, and a pair of suction cups and attachment hooks has been added. The "main" member 410 is the largest member in this view, and its rear surface is visible at 416. The wing set 420 is also visible, showing wing members 440 and 444, having rear surfaces 441 and 447, respectively. For clarity, the other wing set 430 is not shown in this view.

There are two suction cups 480 and 490 that can be used to attach the reflective arrowhead sign to an object, such as a vehicle. Each suction cup has a hook attached to its rear portion, and this hook runs downward and is bent so as to run through one of the mounting holes 414 in the main member 410. The hooks are illustrated at 482 and 492 for the suction cups 480 and 490, respectively.

Figure 29:
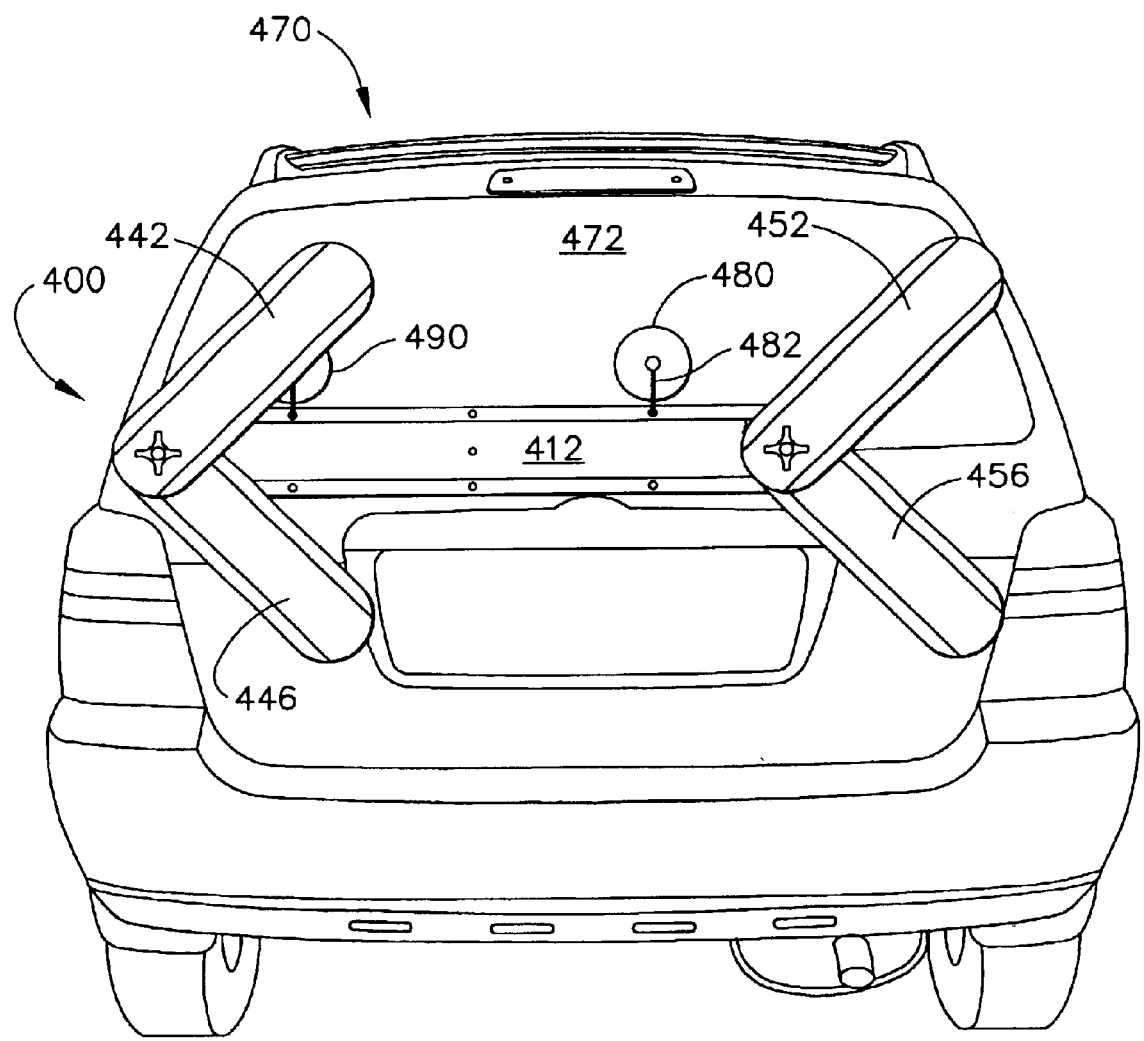
FIG. 29 is an elevational view of the reflective arrowhead sign of FIG. 18 as it is attached to the rear of a motor vehicle.

FIG. 29 illustrates a typical use of the reflective arrowhead sign 400 along with the suction cups 480 and 490. In FIG. 29, a motor vehicle such as a van or an SUV is illustrated at 470. Its rear window is designated at 472, and the suction cups 480 and 490 are attached thereto. The sign 400 hangs down from the suction cups via the hooks 482 and 492. In FIG. 29, the arrowhead wing sets are pointed to the left, which would be a typical use of the reflective arrowhead sign 400 for a vehicle that is pulled off along the right side of a roadway surface.

Figure 30:
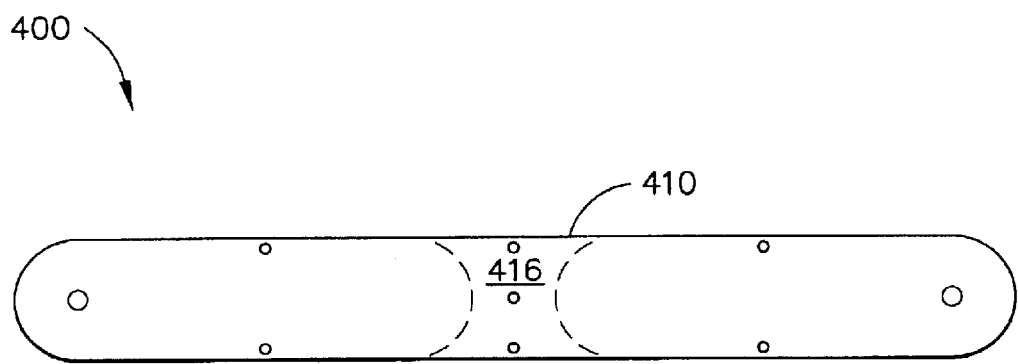
FIG. 30 is a rear view of the reflective arrowhead sign of FIG. 18.
Figure 31:
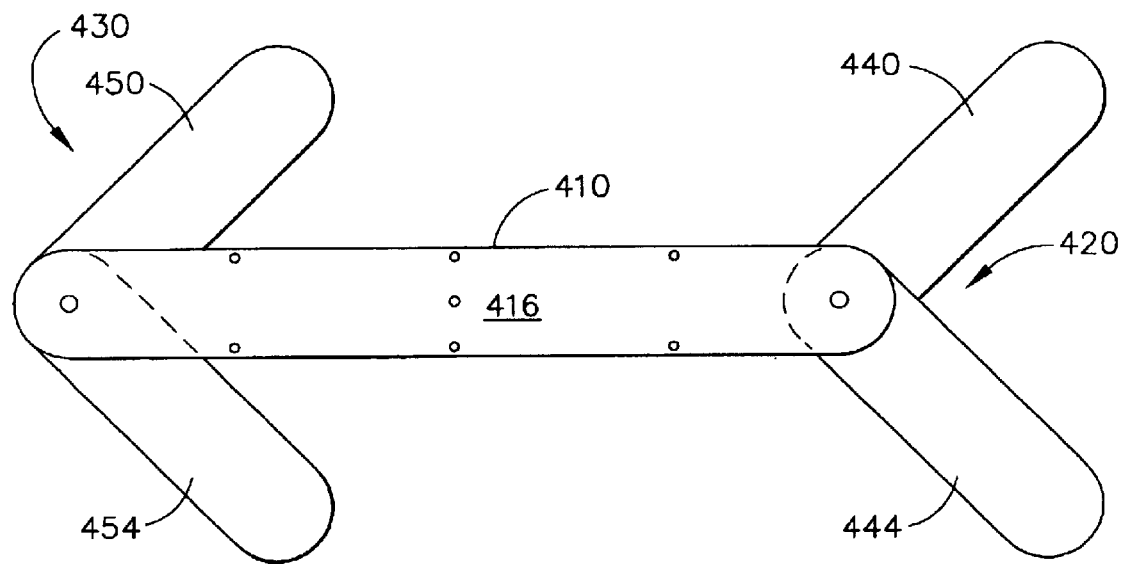
FIG. 31 is a rear view of the reflective arrowhead sign of FIG. 19.

FIG. 30 illustrates the rear of the arrowhead sign 400, showing the main member 410 and its rear surface 416. FIG. 31 illustrates a rear view of the same arrowhead sign apparatus 400, but with its arrowhead wing sets extended as viewed in FIG. 19. Of course, as seen from the rear, the arrowhead wing sets point to the left, whereas on FIG. 19 they pointed to the right.

Figure 32:
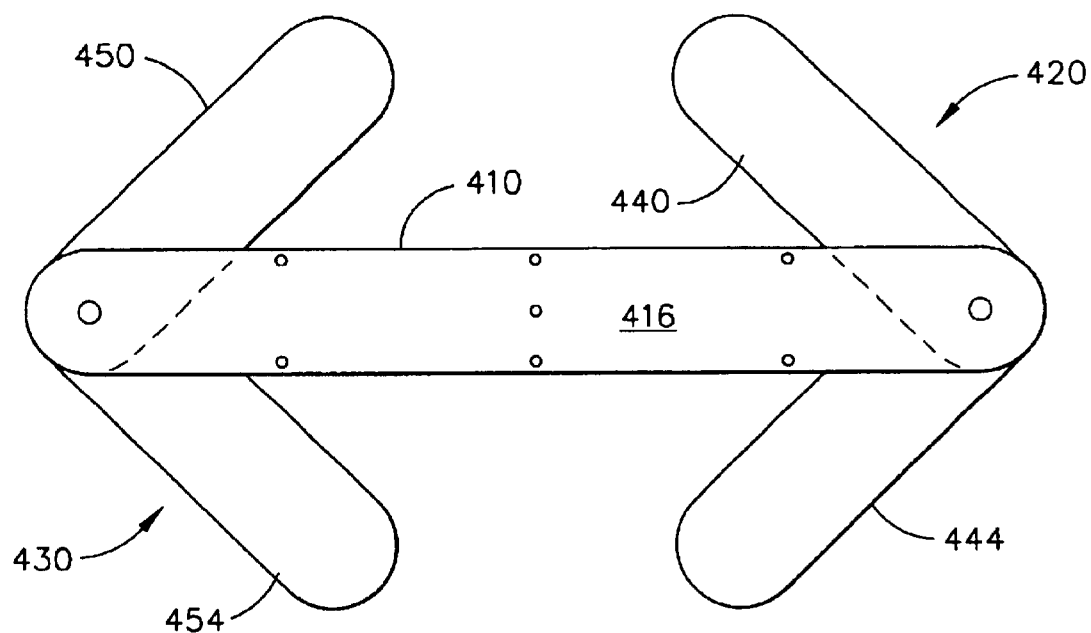
FIG. 32 is a rear view of the reflective arrowhead sign of FIG. 20.

FIG. 32 illustrates a rear view of the same arrowhead sign 400, but with the arrowhead wing sets extended as per the illustration of FIG. 20. This rear view essentially shows the same orientation as the front view of FIG. 20, since the wing sets would be essentially symmetrical in this arrangement.

Figure 33:
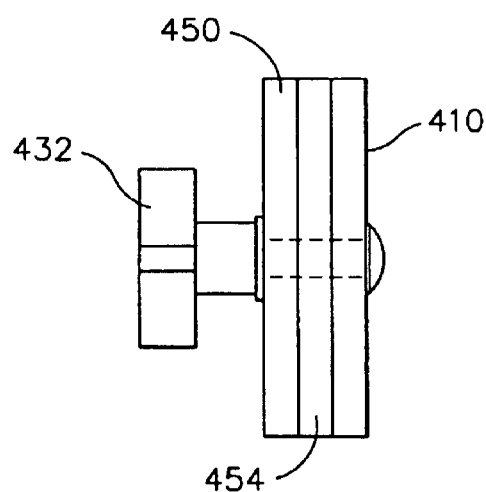
FIG. 33 is a right end or side view of the reflective arrowhead sign of FIG. 18.
Figure 34:
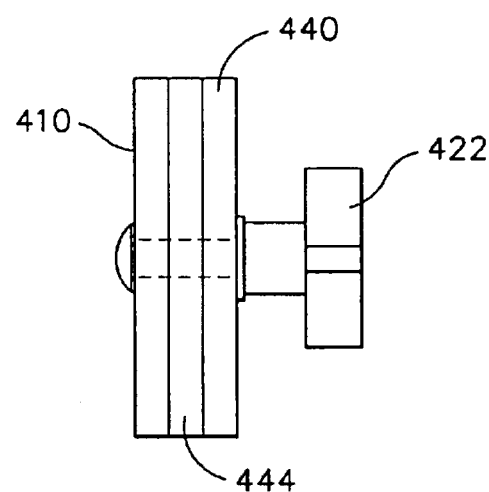
FIG. 34 is a left end or side view of the reflective arrowhead sign of FIG. 18.

FIG. 33 shows the same reflective arrowhead sign 400 from its right end, and shows the orientation of the main member 410 and the members 450 and 454 of wing set 430. FIG. 34 illustrates the same apparatus from the left end, and depicts the main member 410 along with the wing members 440 and 444 of the wing set 420.

Figure 35:
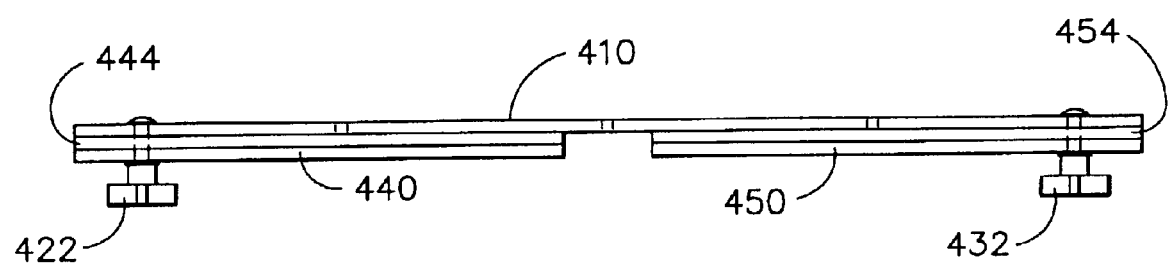
FIG. 35 is a top view of the reflective arrowhead sign of FIG. 18.

FIG. 35 illustrates the same reflective arrowhead sign 400 as illustrated in FIG. 18, in which the two wing sets 420 and 430 are folded in a position where they are parallel to the longitudinal axis of the main member 410.

Figure 36:
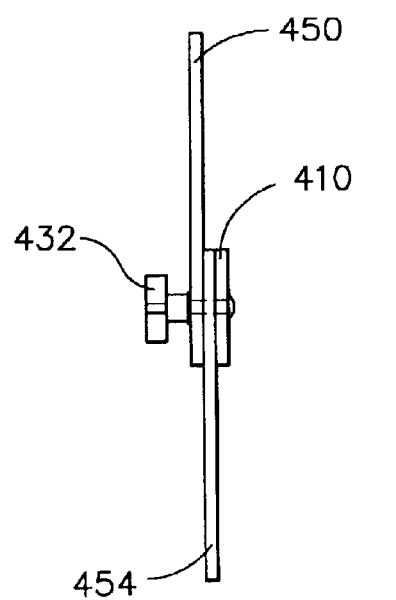
FIG. 36 is a right end or side view of the reflective arrowhead sign of FIG. 19.
Figure 37:
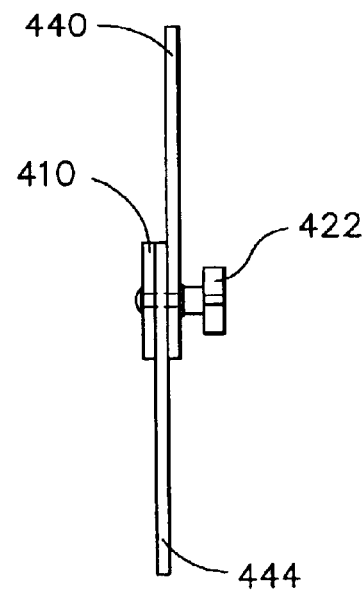
FIG. 37 is a left end or side view of the reflective arrowhead sign of FIG. 19.

FIG. 36 is another right-end or side view of the same reflective arrowhead sign 400, although in this view the configuration illustrated in FIG. 19 is depicted. In FIG. 36, the wing set 430 is visible, in which the wing member 450 is pointed upward in this view, and the wing member 454 is pointed downward in this view. FIG. 37 is a left end or side view of the same apparatus 400 and in the same configuration. In FIG. 37, the wing member 440 is extending upward while the wing member 444 is extending downward, thus showing the wing set 420.

FIG. 38 illustrates a top view of the reflective arrowhead sign 400 when positioned in the configuration illustrated in FIG. 19. In this top view of FIG. 38, the two wing sets 420 and 430 are both pointing to the left, and the individual wing members are illustrated.

FIG. 39 illustrates the same reflective arrowhead sign 400 from its right end or right side, in the configuration illustrated in FIG. 20. The wing set 430 can be easily seen, and in this configuration, the wing members 450 and 454 have the same appearance as they had in FIG. 36. FIG. 40 illustrates the same apparatus 400 in the configuration illustrated in FIG. 20, this time from the left end or left side. The wing set 420 is illustrated, showing the wing members 440 and 444, and they are almost in the same orientation as were seen in FIG. 37.

Figure 41:
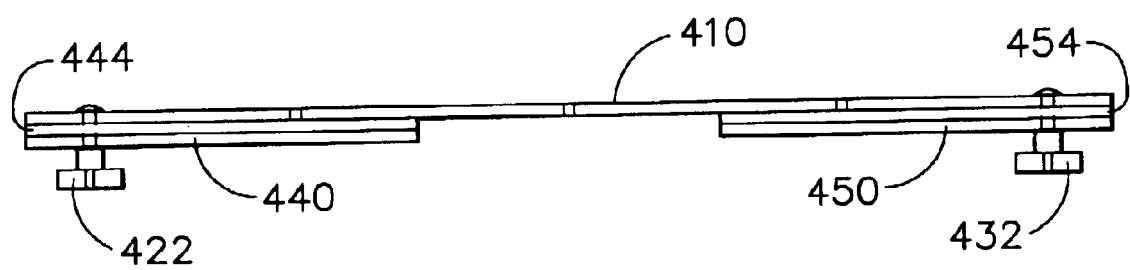
FIG. 41 is a top view of the reflective arrowhead sign of FIG. 20.

FIG. 41 illustrates a top view of the reflective arrowhead sign 400 in the configuration as illustrated in FIG. 20. In this view, the two wing sets 420 and 430 are both pointing inward toward the center or mid-point of the main member 410. It can be easily seen that the wing members 440, 444, 450, and 454 are sloped at an angle that is not parallel to the longitudinal axis of the main member 410. This is apparent, since the "gap" between the innermost edges of these wing members is larger in FIG. 41 than it was in FIG. 35 (which showed the same apparatus in a configuration in which the wing members were folded so that they were parallel to the longitudinal axis of the main member 410).

It will be understood that the "planar" surfaces described herein do not literally need to be perfectly "flat" for the purposes of the present invention. In fact, in some instances it might be better if the major "open" surfaces of the highly-reflective members exhibit a small amount of curvature, especially if the designer plans to use a diffuse reflection scheme rather than a retroreflection scheme to make the structure highly visible. If a curvature is selected for the major "open" surfaces, then such curvature could be either concave or convex, and the curvature could be oriented either from left-to-right, or from top-to-bottom, as desired by the designer, or for ease of manufacture. If a more complex curvature is desired, such as a parabolic shape in two axes, then this could be easily constructed using a plastic injection mold rather than using an extrusion process. Of course, this design would likely be more expensive to produce, but it would still fall within the teachings of the present invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

The invention claimed is:

1. A reflective sign, comprising:
    a longitudinal member having first and second longitudinal edges, a first end and a second end, said longitudinal member having a surface that exhibits a highly reflective characteristic at visible light wavelengths;
    a first wing member that attachably and detachably snaps onto said longitudinal member along said first longitudinal edge, said first wing member having a surface that exhibits a highly reflective characteristic at visible light wavelengths; and
    a second wing member that attachably and detachably snaps onto said longitudinal member along said second longitudinal edge, said second wing member having a surface that exhibits a highly reflective characteristic at visible light wavelengths;
    wherein, when said first and second wing members are attached to said longitudinal member proximal to one of said first and second ends, said reflective sign forms an arrowhead-style pointing shape, such that said longitudinal member forms a shaft-shape and said first and second wing members form an arrowhead tip-shape.

2. The reflective sign as recited in claim 1, wherein when said longitudinal member is positioned in a substantially horizontal orientation, said first and second wing members point either to a left-direction or to a right-direction, depending upon an orientation of said reflective sign.

3. The reflective sign as recited in claim 1, wherein at least one of said first and second longitudinal edges of the longitudinal member exhibits a plurality of spaced-apart mounting holes.

4. The reflective sign as recited in claim 3, further comprising at least two hook members that each extend through one of said spaced-apart mounting holes, so as to allow said reflective sign to be mounted from an external object.

5. The reflective sign as recited in claim 1, further comprising a second longitudinal member that attachably and detachably snaps onto said longitudinal member at one of said first end and said second end of the longitudinal member, said second longitudinal member having a surface that exhibits a highly reflective characteristic at visible light wavelengths, and thereby extending an effective distance of the shaft-shape portion of said arrowhead-style pointing shape.

6. The reflective sign as recited in claim 5, wherein said surfaces that exhibit a highly reflective characteristic, exhibit a retroreflective optical characteristic.

7. The reflective sign as recited in claim 6, wherein:
    said longitudinal member contains a set of locating pins;
    said second longitudinal member, said first wing member, and said second wing member each contain locating holes; and
    said locating pins are placed within said locating holes in a manner that attaches said second longitudinal member, said first wing member, and said second wing member to said first longitudinal member.

8. The reflective sign as recited in claim 1, wherein:
    said longitudinal member contains a set of locating pins;
    said first wing member and said second wing member each contain locating holes; and
    said locating pins are placed within said locating holes in a manner that attaches said first wing member and said second wing member to said first longitudinal member.

9. The reflective sign as recited in claim 8, wherein said first and second wing members, on opposite surfaces of said wing members, exhibit surfaces that each exhibit a highly reflective characteristic at visible light wavelengths, and said first and second wing members each exhibit two sets of said locating holes and each exhibit a symmetrical shape that allows either of said wing members to be attached along either of the longitudinal edges of said longitudinal member while pointing in a correct direction.

10. The reflective sign as recited in claim 1, wherein said surfaces that exhibits a highly reflective characteristic exhibit a retroreflective optical characteristic.

11. The reflective sign as recited in claim 1, further comprising: (a) a first plurality of projections on said longitudinal member located proximal to said first longitudinal edge, (b) a first plurality of openings in said first wing member located proximal to an edge of the first wing member, (c) a second plurality of projections on said longitudinal member located proximal to said second longitudinal edge, and (d) a second plurality of openings in said second wing member located proximal to an edge of the second wing member;

wherein said first plurality of projections mates with said first plurality of openings to enable said first wing member to attachably snap onto said longitudinal member; and said second plurality of projections mates with said second plurality of openings to enable said second wing member to attachably snap onto said longitudinal member.

12. A reflective sign, comprising:

a longitudinal member having first and second longitudinal edges, a first end and a second end, said longitudinal member having a surface that exhibits a highly reflective characteristic at visible light wavelengths along a substantially continuous pathway of said surface;

a first wing member and a second wing member that are each pivotally attached to said longitudinal member proximal to said first end, said first wing member having a first wing end and a second wing end, and said second wing member having a third wing end and a fourth wing end, said first and second wing members being pivotable about a first pivot axis that intersects said longitudinal member, said first wing member's first wing end being supported at said first pivot axis and said first wing member's second wing end being unsupported by any other structure, said second wing member's third wing end being supported at said first pivot axis and said second wing member's fourth wing end being unsupported by any other structure, said first and second wing members each having a surface that exhibits a highly reflective characteristic at visible light wavelengths along a substantially continuous pathway of said surface for each of the first and second wing members, said first and second wing members forming a first wing set; and a third wing member and a fourth wing member that are each pivotally attached to said longitudinal member, said third wing member having a fifth wind end and a sixth wing end, and said fourth wing member having a seventh wing end and an eighth wing end, said third wing member and said fourth wind member both being pivotable about a second pivot axis that intersects said longitudinal member at a location that is spaced-apart from said first pivot axis, said third wing member's fifth wing end being supported at said second pivot axis and said third wing member's sixth wing end being unsupported by any other structure, said fourth wing member's seventh wing end being supported at said second pivot axis and said fourth wing member's eighth wing end being unsupported by any other structure, said third and fourth wing members each having a surface that exhibits a highly reflective characteristic at visible light wavelengths along a substantially continuous pathway of said surface for each of the third and fourth wing members, said third and fourth wing members forming a second wing set;

wherein, when the pivotable positions of said first, second, third, and fourth wing members are not substantially parallel to a longitudinal axis of said longitudinal member, then said first, second, third, and fourth wing members extend beyond both said first and second longitudinal edges of said longitudinal member wherein said first, second, third, and fourth wing members are pivotable in the range of zero degrees through 360 degrees with respect to said longitudinal axis of said longitudinal member, and as such said wing members may be folded into a compact position near zero degrees, for ease of storage, such that the pivotable positions of said first, second, third, and fourth wing members are then substantially parallel to said longitudinal axis of said longitudinal member, and then said first, second, third, and fourth wing members do not substantially extend beyond both said first and second longitudinal edges of said longitudinal member.

13. The reflective sign as recited in claim 12, wherein a combination of said longitudinal member, said first wing set, and said second wing set forms an arrowhead-style pointing shape, such that said longitudinal member forms an arrow shaft-shape, said first wing set forms an arrowhead tip-shape, and said second wing set forms an arrowhead tail feather-shape.

14. The reflective sign as recited in claim 12, wherein a combination of said longitudinal member, said first wing set, and said second wing set forms a double arrowhead-style pointing shape, such that said longitudinal member forms an arrow shaft-shape, said first wing set forms a first arrowhead tip-shape pointing in a first direction, and said second wing set forms a second arrowhead tip-shape pointing in a second direction that is substantially opposite to said first direction.

15. The reflective sign as recited in claim 12, wherein said second pivot axis is located proximal to said second end of the longitudinal member.

16. The reflective sign as recited in claim 12, wherein said second pivot axis is located between said first and second ends of the longitudinal member.

17. The reflective sign as recited in claim 12, wherein at least one of said first and second longitudinal edges of the longitudinal member exhibits a plurality of spaced-apart mounting holes.

18. The reflective sign as recited in claim 12, wherein said surfaces that exhibit a highly reflective characteristic, exhibit a retroreflective optical characteristic.

19. The reflective sign as recited in claim 12, wherein said first pivot axis is located at a first position substantially along said longitudinal axis of the longitudinal member and said second pivot axis is located at a second position substantially along said longitudinal axis of the longitudinal member.

20. The reflective sign as recited in claim 19, further comprising: (a) a first hand-operated fastener, located at said first pivot axis, that can be tightened to fix a predetermined position of said first and second wing members with respect to said longitudinal member, and that can be loosened to allow a position of said first and second wing members with respect to said longitudinal member to be altered; and (b) a second hand-operated fastener, located at said second pivot axis, that can be tightened to fix a predetermined position of said third and fourth wing members with respect to said longitudinal member, and that can be loosened to allow a position of said third and fourth wing members with respect to said longitudinal member to be altered.

21. The reflective sign as recited in claim 20, wherein said first and second hand-operated fasteners each comprise a pivot pin and a thumbscrew.

* * * * *